US012695684B2

(12) United States Patent
Wang et al.

(10) Patent No.: US 12,695,684 B2
(45) Date of Patent: Jul. 28, 2026

(54) CLUSTER SYSTEM MANAGEMENT METHOD AND APPARATUS

(71) Applicant: HUAWEI TECHNOLOGIES CO., LTD., Shenzhen (CN)

(72) Inventors: Hao Wang, Beijing (CN); Qian Huang, Beijing (CN); XueFeng Guan, Wuhan (CN); LongGang Xiang, Wuhan (CN); ZhaoXing Pang, Wuhan (CN); PengHui Ye, Wuhan (CN); Jun Zhang, Shanghai (CN); Zhao Yuan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 18/735,468

(22) Filed: Jun. 6, 2024

(65) Prior Publication Data

US 2024/0323109 A1 Sep. 26, 2024

Related U.S. Application Data

(63) Continuation of application No. PCT/CN2022/138000, filed on Dec. 9, 2022.

(30) Foreign Application Priority Data

Dec. 10, 2021 (CN) .......................... 202111508888.6

(51) Int. Cl.
H04L 43/04 (2022.01)
H04L 43/02 (2022.01)
(Continued)

(52) U.S. Cl.
CPC ............ H04L 43/067 (2013.01); H04L 43/04 (2013.01); H04L 67/568 (2022.05)

(58) Field of Classification Search
CPC ..... H04L 43/067; H04L 67/568; H04L 43/04; H04L 43/02; H04L 43/045; H04L 41/088; H04L 41/12; H04L 41/0686
(Continued)

(56) References Cited

U.S. PATENT DOCUMENTS 8,620,624 B2 * 12/2013 Skibiski .............. H04L 41/0618
702/188
2012/0316906 A1 * 12/2012 Hampapur ............. G06Q 10/06
705/7.12

FOREIGN PATENT DOCUMENTS

CN 101557344 A 10/2009
CN 103118132 A 5/2013
(Continued)

OTHER PUBLICATIONS

Yu, Jia, Zongsi Zhang, and Mohamed Sarwat. "Spatial data management in apache spark: the geospark perspective and beyond." GeoInformatica 23.1, Oct. 22, 2018, total 42 pages.

*Primary Examiner* — Jude Jean Gilles
(74) *Attorney, Agent, or Firm* — WOMBLE BOND DICKINSON (US) LLP

(57) ABSTRACT

A cluster system management method is disclosed. The management method is used on a management node, the cluster system includes the management node and a plurality of compute nodes, the cluster system is responsible for processing service data in a preset area. According to the cluster system management method, the spatial-temporal distribution of the historical service data is analyzed, to obtain the spatial-temporal distribution characteristic of the historical service data, and based on the spatial-temporal distribution characteristic, the preset area is divided into the M sub-areas to achieve balanced data distribution. The compute nodes in the plurality of compute nodes are respectively responsible for processing the service data of the
(Continued)

corresponding sub-areas, thereby implementing management based on spatial routing of the cluster system and improving reliability and a scale expansion capability of the cluster system.

24 Claims, 11 Drawing Sheets

(51) Int. Cl.
    *H04L 43/045*       (2022.01)
    *H04L 43/067*       (2022.01)
    *H04L 67/568*       (2022.01)
    *H04L 41/0686*     (2022.01)
    *H04L 41/12*       (2022.01)

(58) Field of Classification Search
    USPC ......................................................... 709/224
    See application file for complete search history.

(56) References Cited

FOREIGN PATENT DOCUMENTS

| | | | |
|---|---|---|---|
| CN | 102929989 | B | 1/2016 |
| CN | 105354091 | A | 2/2016 |
| CN | 109241161 | A | 1/2019 |
| CN | 111159107 | A | 5/2020 |
| CN | 113569937 | A | 10/2021 |
| KR | 101980699 | B1 | 5/2019 |

* cited by examiner

Aggregate up

Intermediate level

Split down

| 40 | 20 | 90 |
|----|----|----|
|    | 80 70 / 65 85 | 90 |
| 60 | 50 | 50 |
|    | 30 | 70 |

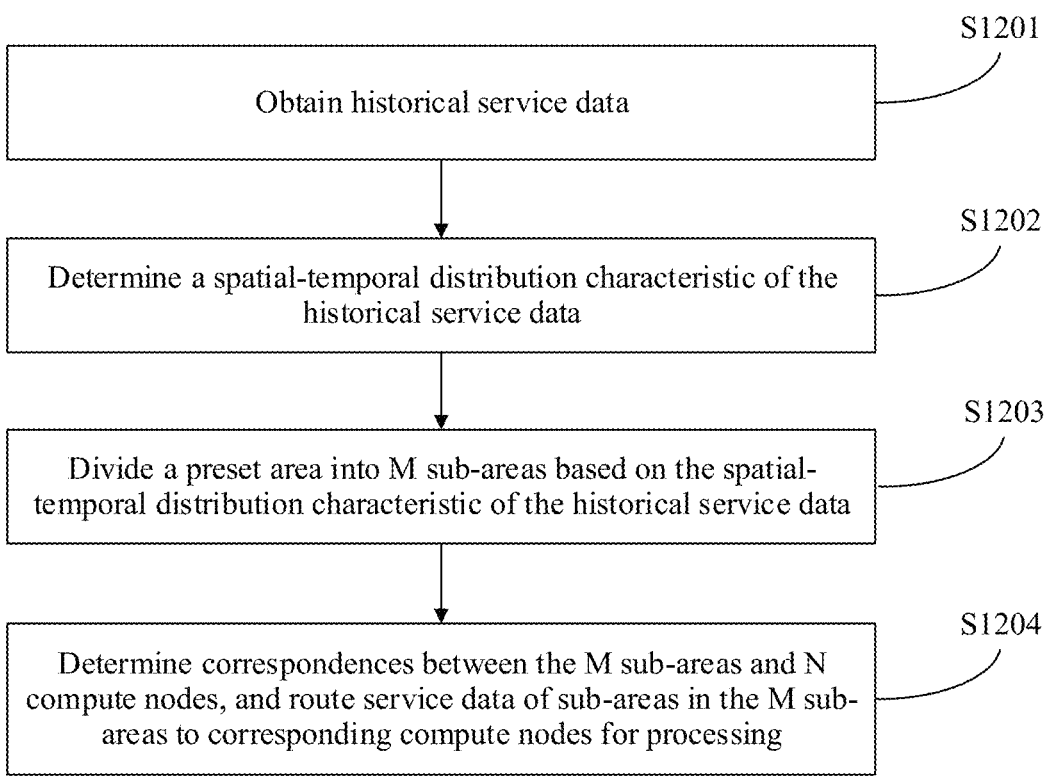

S1201

Obtain historical service data

S1202

Determine a spatial-temporal distribution characteristic of the historical service data

S1203

Divide a preset area into M sub-areas based on the spatial-temporal distribution characteristic of the historical service data

S1204

Determine correspondences between the M sub-areas and N compute nodes, and route service data of sub-areas in the M sub-areas to corresponding compute nodes for processing

FIG. 12

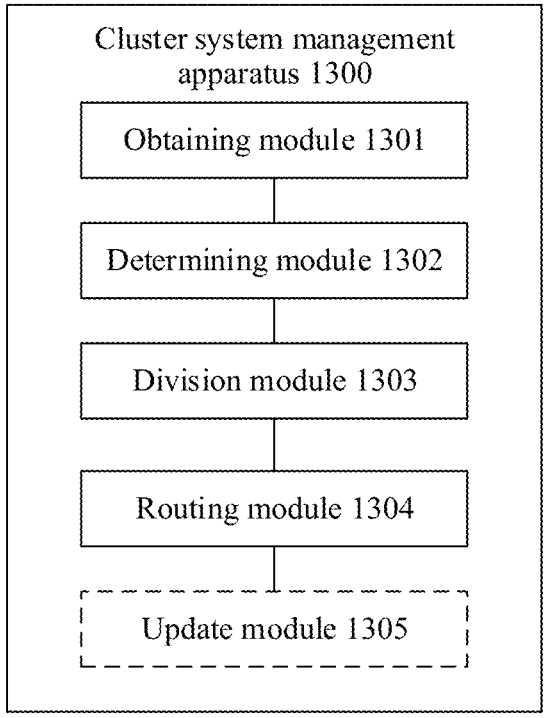

Cluster system management apparatus 1300

Obtaining module 1301

Determining module 1302

Division module 1303

Routing module 1304

Update module 1305

FIG. 13

CLUSTER SYSTEM MANAGEMENT METHOD AND APPARATUS

CROSS-REFERENCE TO RELATED APPLICATIONS

This application is a continuation of International Application No. PCT/CN2022/138000, filed on Dec. 9, 2022, which claims priority to Chinese Patent Application No. 202111508888.6, filed on Dec. 10, 2021. The disclosures of the aforementioned applications are hereby incorporated by reference in their entireties.

TECHNICAL FIELD

This application relates to the field of computer technologies, and in particular, to a cluster system management method and apparatus.

BACKGROUND

Currently, a distributed big data system is managed in a master-slave mode. A master node is responsible for work such as task distribution, data collection, and resource scheduling, and a slave node mainly performs data processing and computing. Any slave node may manage or store data in any area. As a scale of the system continuously expands and service functions become increasingly complex, this mode faces many problems and challenges.

For example, FIG. 1 shows a processing architecture of a telecommunications service system. Related processing needs to be performed on data by a plurality of functional clusters, such as a collection cluster, an association cluster, and a positioning cluster, from data collection to data flushed to a disk and stored in a data warehouse. Data distribution policies are not unified (for example, a previous level of the system is distributed by network element, and a next level is distributed by user). As a result, nodes in different processing clusters interact with each other in a mesh manner. If a single node fails, cascading amplification effect occurs, and system reliability is low.

In addition, the single node may process data in any area. Therefore, public data (such as a map and a fingerprint database) that needs to be used during processing needs to be fully cached on the single node or a large configuration table of the public data needs to be broadcast in a cluster. With continuous expansion of a system processing scale, a system processing capability decreases, and degraded running is required.

SUMMARY

This application provides a cluster system management method and apparatus, to implement management based on spatial routing of a cluster system and improve reliability and a scale expansion capability of the cluster system.

According to a first aspect, this application provides a cluster system management method. The management method is used on a management node, the cluster system includes the management node and N compute nodes, the cluster system is responsible for processing service data in a preset area, N is an integer greater than 1, and the management method includes: obtaining historical service data, where the historical service data is service data in several periods before a current period; determining a spatial-temporal distribution characteristic of the historical service data; dividing the preset area into M sub-areas based on the spatial-temporal distribution characteristic of the historical service data, where distribution of the historical service data between the M sub-areas is balanced; and determining correspondences between the M sub-areas and the plurality of compute nodes, and routing service data of sub-areas in the M sub-areas to corresponding compute nodes for processing.

According to the cluster system management method provided in the first aspect, the spatial-temporal distribution of the historical service data is analyzed, to obtain the spatial-temporal distribution characteristic of the historical service data, and based on the spatial-temporal distribution characteristic, the preset area is divided into the M sub-areas to achieve balanced data distribution. The compute nodes in the plurality of compute nodes are respectively responsible for processing the service data of the corresponding sub-areas, thereby implementing management based on spatial routing of the cluster system and improving reliability and a scale expansion capability of the cluster system.

One of ordinary skilled in the art may understand that, that a difference value in distribution of the historical service data between the M sub-areas is less than a preset threshold (for example, the preset threshold may be 1 MB) can be understood that the distribution of the historical service data between the M sub-areas is balanced.

In an embodiment, the determining a spatial-temporal distribution characteristic of the historical service data includes: determining, based on spatial distribution characteristics of service data in a plurality of periods of time in the historical service data, spatial distribution matrices of service data respectively corresponding to a plurality of time slices, where adjacent periods of time in the plurality of periods of time are continuous; and determining the spatial-temporal distribution characteristic of the historical service data based on the spatial distribution matrices of the service data respectively corresponding to the plurality of time slices.

In an embodiment, the determining the spatial-temporal distribution characteristic of the historical service data based on the spatial distribution matrices of the service data respectively corresponding to the plurality of time slices includes: performing normalization on spatial distribution matrices of service data corresponding to time slices in the plurality of time slices, to determine normalized spatial distribution matrices of the service data corresponding to the time slices; dividing the plurality of time slices into a plurality of types of time slices based on a similarity between the normalized spatial distribution matrices of the service data corresponding to the time slices; and performing aggregation on the normalized spatial distribution matrices of the service data corresponding to the plurality of types of time slices, to determine an aggregated distribution matrix of the plurality of types of time slices, where the aggregated distribution matrix of the plurality of types of time slices indicates the spatial-temporal distribution characteristic of the historical service data.

In an embodiment, the dividing the preset area into M sub-areas based on the spatial-temporal distribution characteristic of the historical service data includes: dividing the preset area into the M sub-areas based on the spatial-temporal distribution characteristic of the historical service data and a spatial proximity relationship, where the distribution of the historical service data between the M sub-areas is balanced.

In an embodiment, the dividing the preset area into the M sub-areas based on the spatial-temporal distribution characteristic of the historical service data and a spatial proximity relationship includes: determining an adaptive division threshold; performing initial spatial grid division on the historical service data based on the adaptive division threshold; determining amounts of data in sub-grids in the initial spatial grid based on the spatial-temporal distribution characteristic of the historical service data; traversing the sub-grids in the initial spatial grid, and performing subdivision or aggregation on the sub-grids in the initial spatial grid based on the amounts of data in the sub-grids in the initial spatial grid and the adaptive division threshold, to determine division of an adaptive spatial grid of the historical service data; and dividing the preset area into the M sub-areas based on proximity relationships of sub-grids in the adaptive spatial grid and amounts of data in the sub-grids in the adaptive spatial grid, where distribution of amounts of data in the M sub-areas is balanced.

In an embodiment, the performing initial spatial grid division on the historical service data based on the adaptive division threshold includes: determining an initial division level based on the adaptive division threshold and location information of the preset area; and performing the initial spatial grid division on the historical service data based on the initial division level and a spatial distribution-based level computing model.

In an embodiment, the dividing the preset area into the plurality of sub-areas based on proximity relationships of sub-grids in the adaptive spatial grid and amounts of data in the sub-grids in the adaptive spatial grid includes: determining, based on the division of the adaptive spatial grid of the historical service data, an undirected graph corresponding to the adaptive spatial grid, where nodes of the undirected graph are determined based on the sub-grids in the adaptive spatial grid, weights of the nodes are determined based on the amounts of data in the sub-grids in the adaptive spatial grid, edges connected to adjacent nodes are determined based on the proximity relationships of the sub-grids in the adaptive spatial grid, and weights of the edges are determined based on distances of adjacent sub-grids in the adaptive spatial grid; determining an adjacency matrix of the undirected graph based on the undirected graph corresponding to the adaptive spatial grid; and dividing the preset area into the M sub-areas based on the undirected graph corresponding to the adaptive spatial grid and the adjacency matrix of the undirected graph, where the distribution of the amounts of data in the M sub-areas is balanced.

In an embodiment, the determining correspondences between the M sub-areas and the N compute nodes includes: determining that N is greater than or equal to M; and dividing the N compute nodes into M sub-clusters, where the M sub-clusters one-to-one correspond to the M sub-areas.

In an embodiment, the determining correspondences between the M sub-areas and the N compute nodes includes: determining that N is less than M; collecting statistics on average amounts of service data of the sub-areas in the M sub-areas in a plurality of periods of time; and dividing the M sub-areas into N groups of sub-areas with the aim of minimizing difference values in the average amounts of service data between groups, where the N groups of sub-areas one-to-one correspond to the N compute nodes.

In an embodiment, the management method further includes: determining, based on a spatial-temporal distribution characteristic of historical service data of the current period and a spatial-temporal distribution characteristic of historical service data of a previous period, whether the division of the preset area needs to be updated.

In an embodiment, the determining, based on a spatial-temporal distribution characteristic of historical service data of the current period and a spatial-temporal distribution characteristic of historical service data of a previous period, whether the division of the preset area needs to be updated includes:

comparing whether a similarity between the spatial-temporal distribution characteristic of the historical service data of the current period and the spatial-temporal distribution characteristic of the historical service data of the previous period is greater than a preset threshold; and if the similarity between the spatial-temporal distribution characteristic of the historical service data of the current period and the spatial-temporal distribution characteristic of the historical service data of the previous period is greater than the preset threshold, determining that the division of the preset area needs to be updated, or if the similarity between the spatial-temporal distribution characteristic of the historical service data of the current period and the spatial-temporal distribution characteristic of the historical service data of the previous period is not greater than the preset threshold, determining that the division of the preset area does not need to be updated.

In an embodiment, compute nodes in the plurality of compute nodes cache data related to a service in sub-areas corresponding to the compute nodes.

According to a second aspect, this application provides a cluster system management apparatus, where the management apparatus is applied to a cluster system, the cluster system includes a management node and N compute nodes, the cluster system is responsible for processing a load request in a preset area, N is an integer greater than 1, and the apparatus includes:

an obtaining module, configured to obtain historical service data, where the historical service data is service data in several periods before a current period;

a determining module, configured to determine a spatial-temporal distribution characteristic of the historical service data;

a division module, configured to divide the preset area into M sub-areas based on the spatial-temporal distribution characteristic of the historical service data, where distribution of the historical service data between the M sub-areas is balanced; and a routing module, configured to: determine correspondences between the M sub-areas and the N compute nodes and route service data of sub-areas in the M sub-areas to corresponding compute nodes for processing.

In an embodiment, the determining module is configured to: determine, based on spatial distribution characteristics of service data in a plurality of periods of time in the historical service data, spatial distribution matrices of service data respectively corresponding to a plurality of time slices, where adjacent periods of time in the plurality of periods of time are continuous; and determine the spatial-temporal distribution characteristic of the historical service data based on the spatial distribution matrices of the service data respectively corresponding to the plurality of time slices.

In an embodiment, the determining the spatial-temporal distribution characteristic of the historical service data based on the spatial distribution matrices of the service data respectively corresponding to the plurality of time slices includes:

performing normalization on spatial distribution matrices of service data corresponding to time slices in the plurality of time slices, to determine normalized spatial distribution matrices of the service data corresponding to the time slices;

dividing the plurality of time slices into a plurality of types of time slices based on a similarity between the normalized spatial distribution matrices of the service data corresponding to the time slices; and performing aggregation on the normalized spatial distribution matrices of the service data corresponding to the plurality of types of time slices, to determine an aggregated distribution matrix of the plurality of types of time slices, where the aggregated distribution matrix of the plurality of types of time slices indicates the spatial-temporal distribution characteristic of the historical service data.

In an embodiment, the division module is configured to divide the preset area into the plurality of sub-areas based on the spatial-temporal distribution characteristic of the historical service data and a spatial proximity relationship, where the distribution of the historical service data between the M sub-areas is balanced.

In an embodiment, the dividing the preset area into the M sub-areas based on the spatial-temporal distribution characteristic of the historical service data and a spatial proximity relationship includes:

determining an adaptive division threshold;

performing initial spatial grid division on the historical service data based on the adaptive division threshold;

determining amounts of data in sub-grids in the initial spatial grid based on the spatial-temporal distribution characteristic of the historical service data;

traversing the sub-grids in the initial spatial grid, and performing subdivision or aggregation on the sub-grids in the initial spatial grid based on the amounts of data in the sub-grids in the initial spatial grid and the adaptive division threshold, to determine division of an adaptive spatial grid of the historical service data; and dividing the preset area into the M sub-areas based on proximity relationships of sub-grids in the adaptive spatial grid and amounts of data in the sub-grids in the adaptive spatial grid, where distribution of amounts of data in the plurality of sub-areas is balanced.

In an embodiment, the performing initial spatial grid division on the historical service data based on the adaptive division threshold includes:

determining an initial division level based on the adaptive division threshold and location information of the preset area; and performing the initial spatial grid division on the historical service data based on the initial division level and a spatial distribution-based level computing model.

In an embodiment, the dividing the preset area into the M sub-areas based on proximity relationships of sub-grids in the adaptive spatial grid and amounts of data in the sub-grids in the adaptive spatial grid includes:

determining, based on the division of the adaptive spatial grid of the historical service data, an undirected graph corresponding to the adaptive spatial grid, where nodes of the undirected graph are determined based on the sub-grids in the adaptive spatial grid, weights of the nodes are determined based on the amounts of data in the sub-grids in the adaptive spatial grid, edges connected to adjacent nodes are determined based on the proximity relationships of the sub-grids in the adaptive spatial grid, and weights of the edges are determined based on distances of adjacent sub-grids in the adaptive spatial grid;

determining an adjacency matrix of the undirected graph based on the undirected graph corresponding to the adaptive spatial grid; and dividing the preset area into the M sub-areas based on the adaptive spatial grid and the adjacency matrix of the undirected graph, where the distribution of the amounts of data in the M sub-areas is balanced.

In an embodiment, the routing module is configured to: determine that N is greater than or equal to M; and divide the N compute nodes into M sub-clusters, where the M sub-clusters one-to-one correspond to the M sub-areas.

In an embodiment, the routing module is configured to: determine that N is less than M;

collect statistics on average amounts of service data of the sub-areas in the M sub-areas in a plurality of periods of time; and divide the M sub-areas into N groups of sub-areas with the aim of minimizing difference values in the average amounts of service data between groups, where the N groups of sub-areas one-to-one correspond to the N compute nodes.

In an embodiment, the apparatus further includes: an update module, configured to determine, based on a spatial-temporal distribution characteristic of historical service data of the current period and a spatial-temporal distribution characteristic of historical service data of a previous period, whether the division of the preset area needs to be updated.

In an embodiment, the update module is configured to: compare whether a similarity between the spatial-temporal distribution characteristic of the historical service data of the current period and the spatial-temporal distribution characteristic of the historical service data of the previous period is greater than a preset threshold; and if the similarity between the spatial-temporal distribution characteristic of the historical service data of the current period and the spatial-temporal distribution characteristic of the historical service data of the previous period is greater than the preset threshold, determine that the division of the preset area needs to be updated, or if the similarity between the spatial-temporal distribution characteristic of the historical service data of the current period and the spatial-temporal distribution characteristic of the historical service data of the previous period is not greater than the preset threshold, determine that the division of the preset area does not need to be updated.

According to a third aspect, this application provides a cluster system, including a management node and a plurality of compute nodes, where the cluster system is responsible for processing service data in a preset area, the management node includes a memory and a processor, the memory stores instructions, and when the instructions are executed by the processor, the method according to the first aspect is implemented.

According to a fourth aspect, this application provides a computing device, including a memory and a processor, where the memory stores instructions, and when the instructions are executed by the processor, the method according to the first aspect is implemented.

According to a fifth aspect, this application provides a computer storage medium, including computer instructions, and when the computer instructions are executed by a processor, the method according to the first aspect is implemented.

According to a sixth aspect, this application provides a computer program or a computer program product, the computer program or the computer program product includes instructions, and when the instructions are executed, a computer is enabled to perform the method according to the first aspect.

BRIEF DESCRIPTION OF DRAWINGS

FIG. 12 is a schematic flowchart of a cluster system management method according to an embodiment of this application;

FIG. 13 is a schematic diagram of a structure of a cluster system management apparatus according to an embodiment of this application.

DESCRIPTION OF EMBODIMENTS

Technical solutions of this application are further described below in detail with reference to accompanying drawings and embodiments.

The technical solutions of this application are further described below in detail with reference to the accompanying drawings and embodiments.

Figure 1:
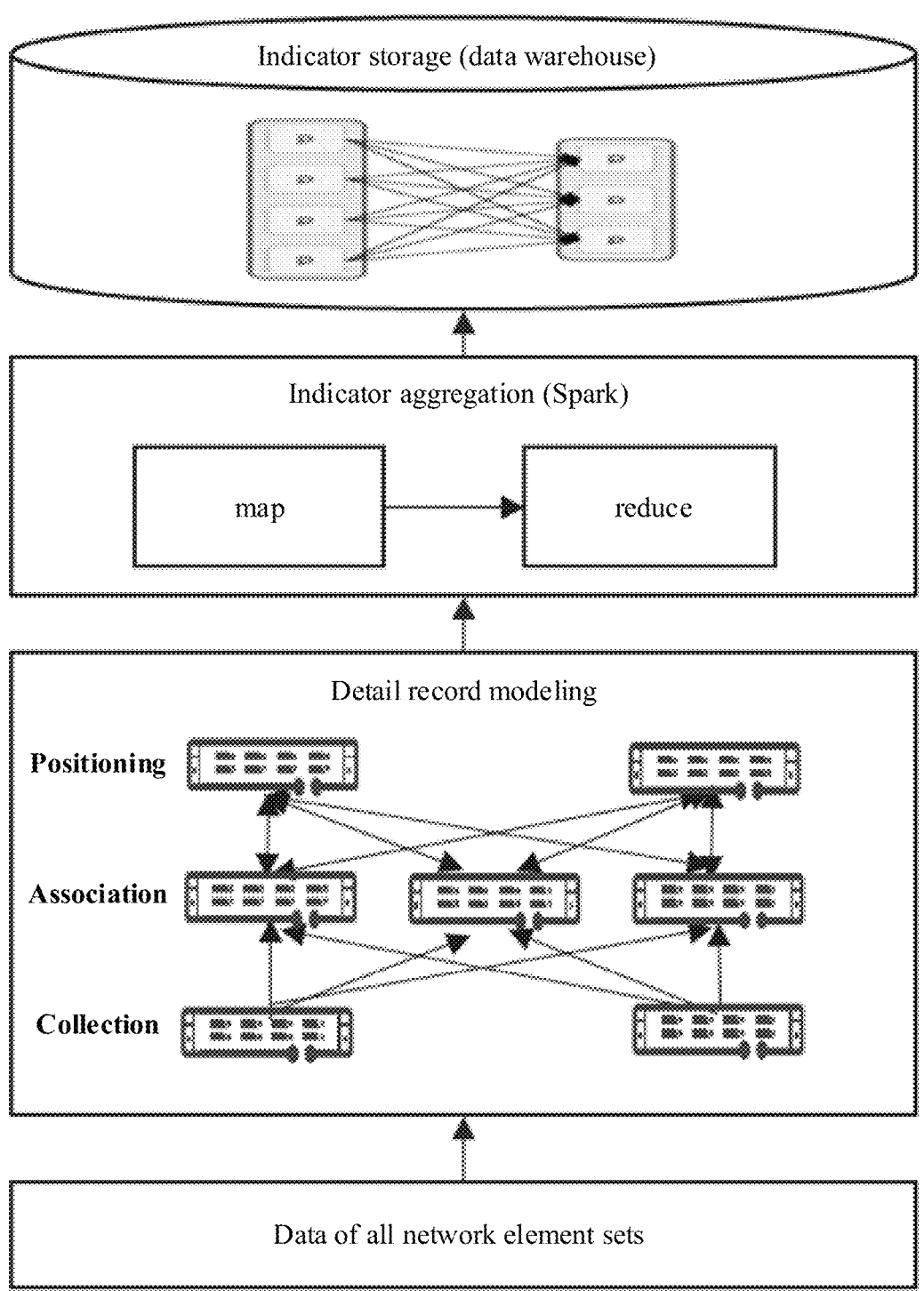
FIG. 1 is a diagram of a processing architecture of an existing telecommunications service system.
Figure 2:
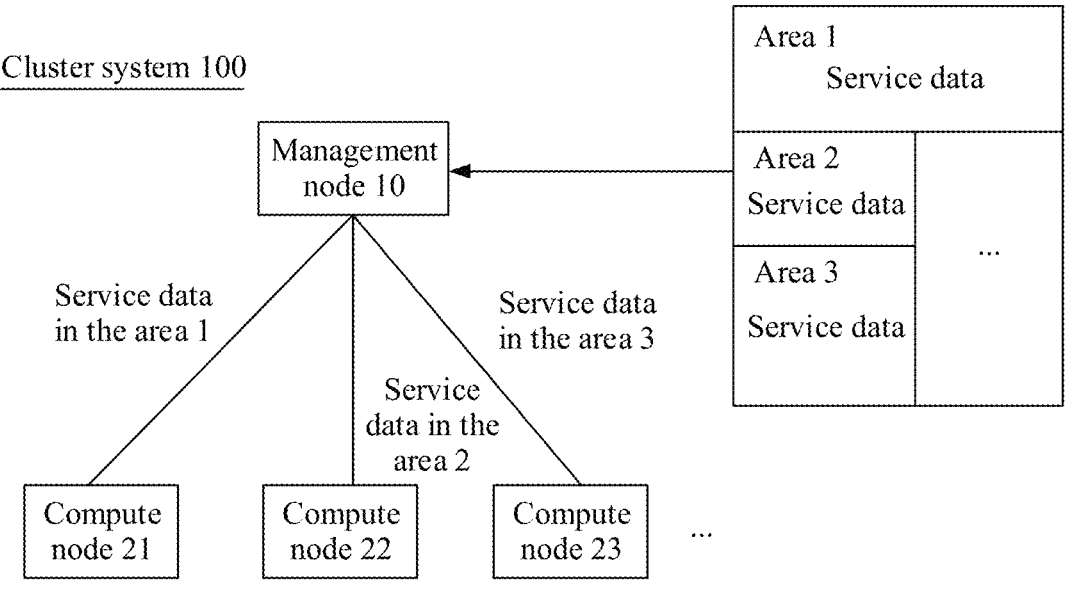
FIG. 2 is a schematic diagram of an architecture of a cluster system according to an embodiment of this application.

FIG. 2 is a schematic diagram of an architecture of a cluster system according to an embodiment of this application. As shown in FIG. 2, a cluster system 100 includes a management node 10 and a plurality of compute nodes (for example, a compute node 21, a compute node 22, and a compute node 23 shown in FIG. 2). The management node 10 is communicatively connected to the plurality of compute nodes, and a communication connection manner of the management node 10 and the plurality of compute nodes is a wireless communication connection or a wired communication connection. The management node 10 is mainly configured to be responsible for task distribution, data collection, resource scheduling, and the like, and the compute node 21, the compute node 22, and the compute node 23 are configured to perform service data processing and computing. In other words, the cluster system may be a distributed system.

The cluster system 100 is responsible for processing service data in a preset area, and dividing the preset area into a plurality of sub-areas, for example, dividing the preset area into the plurality of sub-areas, where the plurality of sub-areas include at least an area 1, an area 2, and an area 3 shown in FIG. 2. The management node 10 receives the service data in the preset area, and then distributes service data in the sub-areas to corresponding compute nodes for processing, for example, distributes the service data in the area 1 to the compute node 21 for processing, distributes the service data in the area 2 to the compute node 22 for processing, and distributes the service data in the area 3 to the compute node 23 for processing. It is easy to understand that, an ellipsis following the compute node 23 in FIG. 2 indicates that in addition to the compute node 21, the compute node 22, and the compute node 23, the plurality of compute nodes may further include one or more other compute nodes. An ellipsis in the preset area indicates that in addition to the area 1, the area 2, and the area 3 shown, the plurality of sub-areas may further include one or more sub-areas.

It should be explained that a quantity of the plurality of compute nodes and a quantity of the plurality of sub-areas obtained by dividing the preset area that are shown in FIG. 2 are merely examples, and constitute no limitation on an embodiment of the application. How the plurality of compute nodes are grouped and how the preset area is divided may be determined based on an actual situation. For example, the quantity of the plurality of compute nodes may be less than the quantity of the plurality of sub-areas, and one compute node may be responsible for processing service data in a plurality of sub-areas. The quantity of the plurality of compute nodes may be equal to the quantity of the plurality of sub-areas, and there is a one-to-one correspondence between the compute nodes and the sub-areas, that is, one compute node is responsible for processing service data in one sub-area. The quantity of the plurality of compute nodes may be greater than the quantity of the plurality of sub-areas, and the plurality of compute nodes are divided into a plurality sub-clusters, and one sub-cluster is responsible for processing service data in one sub-area, that is, a plurality of compute nodes may be jointly responsible for processing service data in one sub-area.

One of ordinary skilled in the art should know that the cluster system, for example, the distributed system, includes the plurality of compute nodes, and the quantity of compute nodes may be deployed based on a requirement of the distributed system on computing resources. This is not specially limited in an embodiment of the application. In the cluster system, the compute nodes are usually deployed in a cluster, that is, several compute nodes form a cluster node. A cluster management program may be deployed on one compute node or cluster node as the management node 10, and other cluster nodes are used as a plurality of cluster nodes. For example, in the distributed system, the cluster management program may be deployed on a master node, where the master node is used as the management node, and other slave nodes are used as the plurality of cluster nodes. One cluster node may include only one compute node or may include a plurality of compute nodes. The compute node includes but is not limited to a personal computer, a workstation, a server, another type of physical machine, a virtual machine deployed on a physical machine, and the like.

According to the cluster system provided in an embodiment of the application, the management node determines a spatial-temporal distribution characteristic of historical service data by analyzing the historical service data in a space dimension and a time dimension in a management area, and divides the data based on the spatial-temporal distribution characteristic of the historical service data. In this way, spatially adjacent data is aggregated on one compute node, and amounts of data of the compute nodes remain balanced. In addition, a cluster is divided to form a plurality of sub-clusters, where the sub-cluster may include one or more nodes, and each sub-cluster manages or processes data or a request in a geographical area and ensures load between the sub-clusters is balanced, thereby forming federated management policy characterized by spatial routing.

Figure 3:
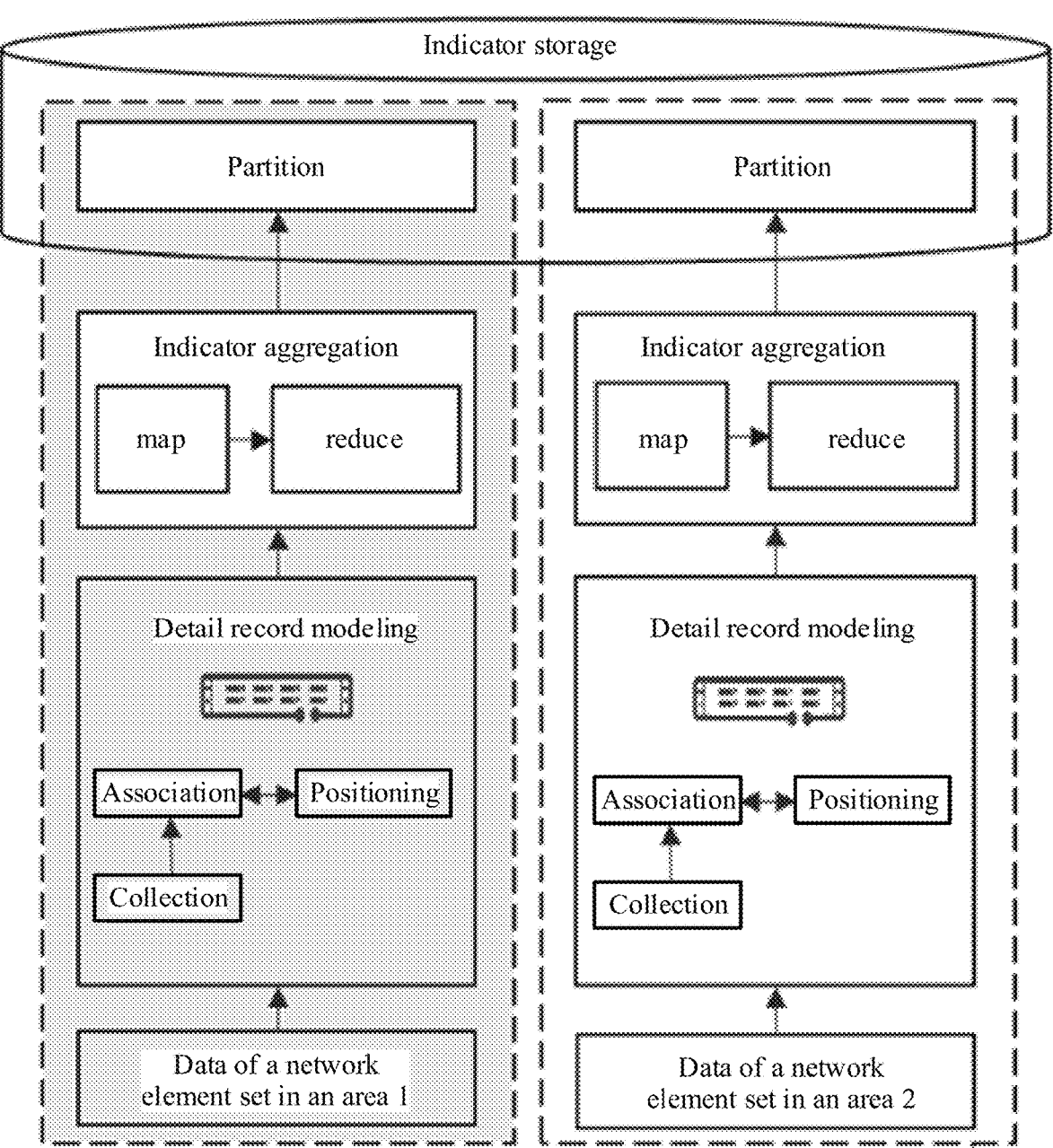
FIG. 3 is a schematic diagram of a processing architecture of a telecommunications service after a cluster system according to an embodiment of this application is applied.

FIG. 3 is a processing architecture of a telecommunications service after a cluster system according to an embodiment of this application is applied. As shown in FIG. 3, in the processing architecture, historical data in a system management scope is analyzed, and management and an area are divided into a plurality of partitions (for example, an area 1 and an area 2) based on a spatial-temporal distribution rule and a tidal characteristic of the data. In addition, a plurality of compute nodes in the cluster system are divided into a plurality of sub-clusters based on the partitioning, to ensure that load of different sub-clusters can be balanced in different periods of time. Each sub-cluster manages data and a computing task in a corresponding geographical area, and management scopes of the sub-clusters do not overlap. In this way, the different sub-clusters do not affect each other, which improves a horizontal expansion capability of the system and reduces cascading amplification effect of a fault.

In addition, because each sub-cluster manages only a part of areas, public data such as a map and a fingerprint database may also be partitioned, and each sub-cluster caches public data belonging to a management area of the sub-cluster. In this way, a processing capability of the system can be greatly improved, to support larger-scale system delivery.

The cluster system provided in an embodiment of the application may be further applied to a positioning scenario. The following describes a solution in which the cluster system provided in an embodiment of the application is applied to the positioning scenario.

Usually, an implementation of a positioning service is to perform Wi-Fi positioning or fingerprint positioning based on a positioning request sent by a user, and a bottom-layer implementation is to query a fingerprint database based on a Wi-Fi ID or a base station cell ID list submitted by the user.

Figure 4:
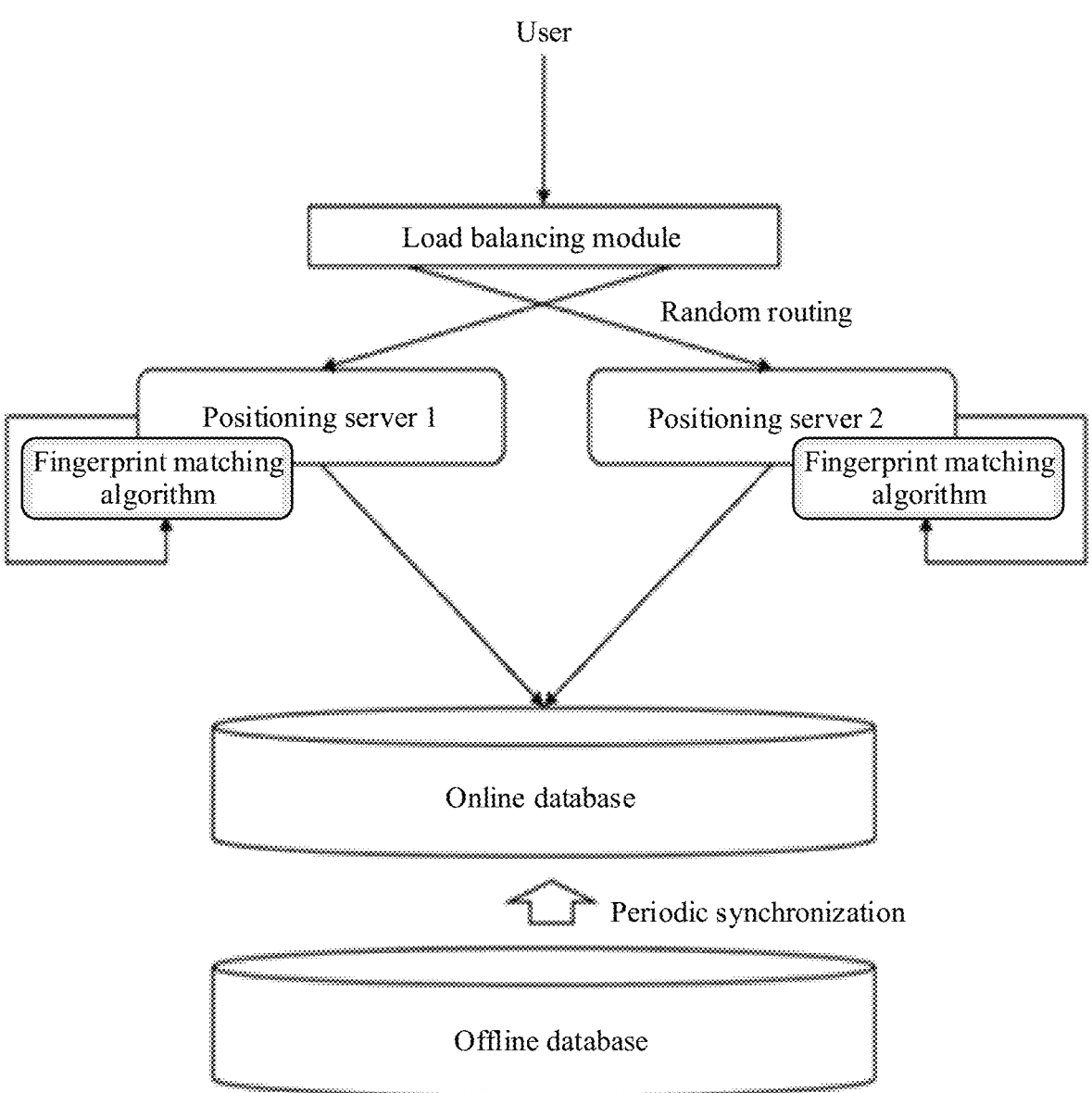
FIG. 4 is a schematic diagram of an architecture of an existing positioning system.

FIG. 4 shows an architecture of an existing positioning system. A positioning service request submitted by a user is sent to a positioning server by using an elastic load balancing module. The elastic load balancing module sends, based on resource overhead statuses of current cluster positioning servers, the task to a server with low resource utilization for execution, which belongs to random routing. This routing mode leads to a very low cache hit rate of the positioning server. Therefore, there is a high probability that the positioning service request of the user is converted into a query request of a bottom-layer database. The positioning system has a high concurrency. Currently, the concurrency reaches 100,000 times per second, which causes great access pressure on the bottom-layer database and causes an access bottleneck.

Figure 5:
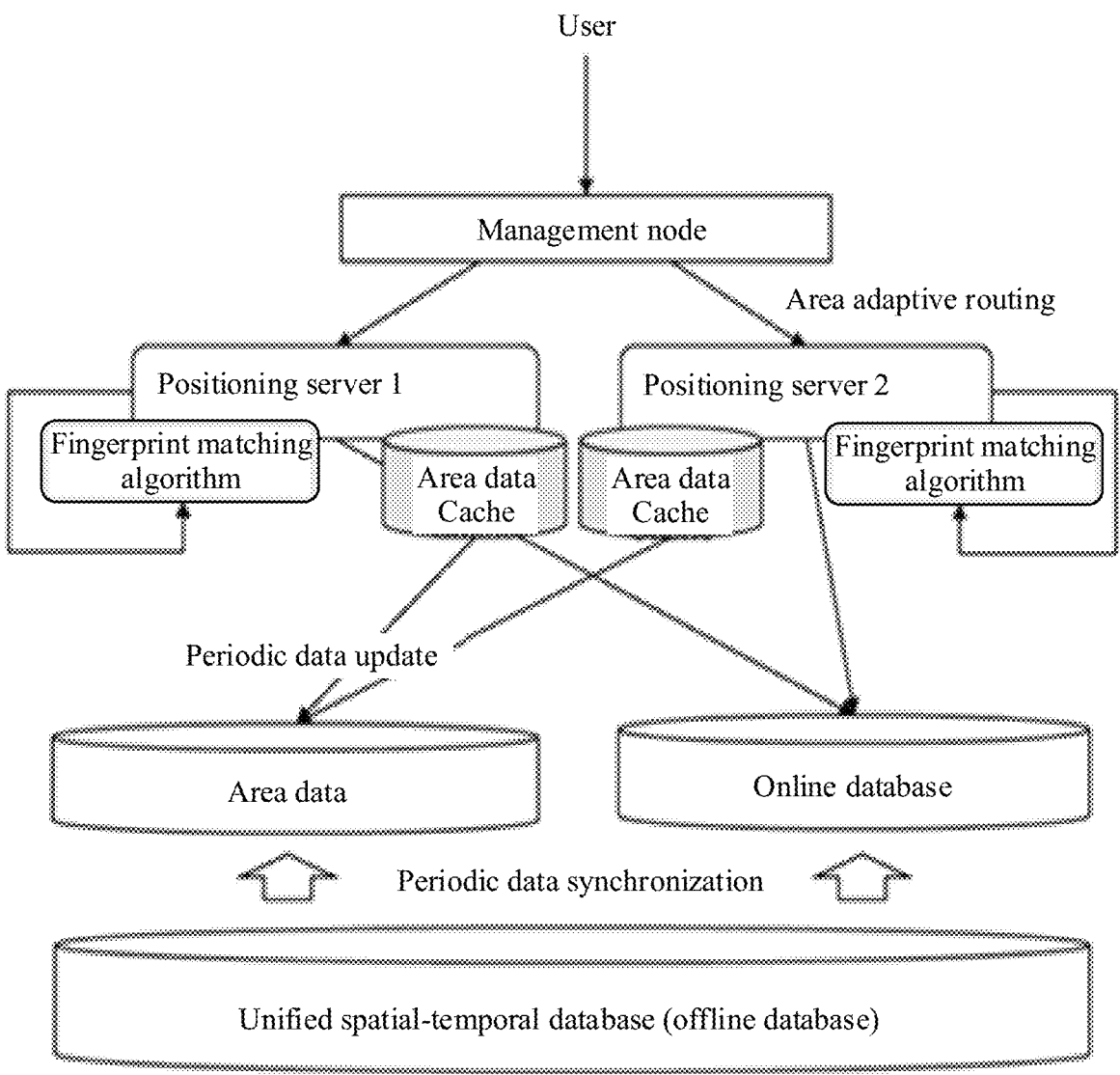
FIG. 5 is a schematic diagram of an architecture of a positioning system after a cluster system according to an embodiment of this application is applied.

FIG. 5 shows an architecture of a positioning system after a cluster system according to an embodiment of this application is applied. A management area is divided into a plurality of partitions based on a historical spatial-temporal distribution rule of positioning requests, and load of positioning service requests in different periods of time in each partition is balanced. A plurality of compute nodes in the cluster system are divided based on the partition, to form a plurality of sub-clusters.

Each sub-cluster only processes a positioning service request submitted in a spatial area, each sub-cluster may include one or more positioning servers, each positioning server is equipped with an in-memory database, and spatial areas processed by the sub-clusters do not overlap.

According to the cluster system provided in an embodiment of the application, random routing based on resource overheads is changed to adaptive routing based on the spatial area, and hot request data in the area is cached in the in-memory database of each sub-cluster, thereby greatly improving a cache hit rate and reducing access pressure of a bottom-layer database. Therefore, a processing capability of the system can be greatly improved without increasing a cluster scale.

A function of management based on spatial routing of a management node of the cluster system provided in an embodiment of the application is implemented by a cluster system management apparatus deployed on the node. In an example, the cluster system management apparatus may be implemented by using program code in a memory. For example, the program is deployed as a package on a master node of the system cluster for data partitioning, distribution, and routing.

Figure 6:
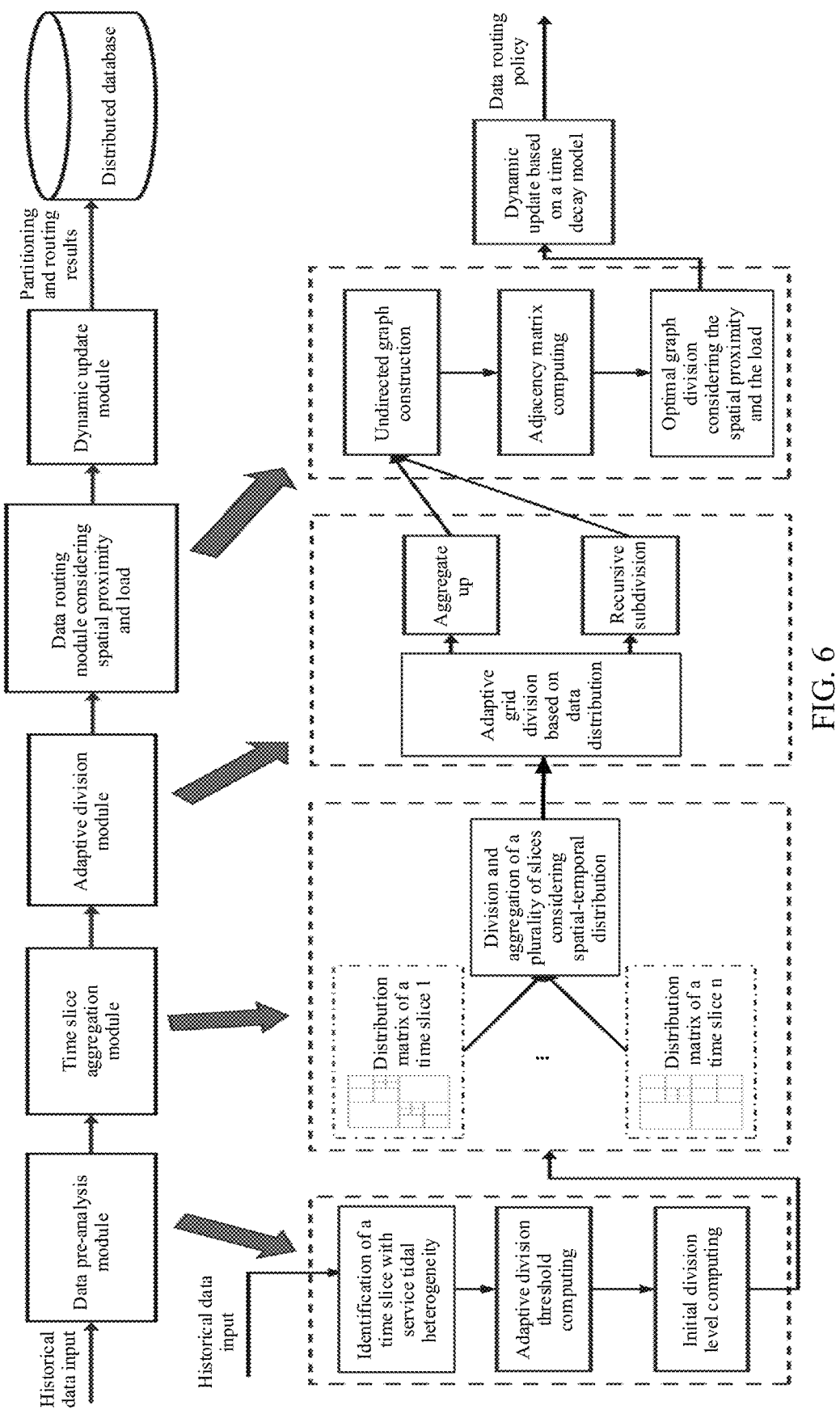
FIG. 6 is a schematic diagram of a structure of a cluster system management apparatus according to an embodiment of this application.

FIG. 6 is a schematic diagram of a structure of a cluster system management apparatus according to an embodiment of this application. As shown in FIG. 6, the cluster system management apparatus may include five modules: a data pre-analysis module, a time slice aggregation module, an adaptive division module, a data routing module considering spatial proximity and load, and a dynamic update module.

The data pre-analysis module is configured to: perform a pre-analysis operation on historical service data, analyze a distribution mode of the historical service data in a space dimension and a time dimension, identify a time slice whose spatial-temporal distribution of the historical service data is significantly different, and classify time slices. A spatial adaptive division threshold and an initial division level are computed based on a spatial distribution characteristic of the data.

The time slice aggregation module is configured to: construct a distribution matrix and aggregate distribution matrices corresponding to different time slices, to obtain an optimal average distribution result considering characteristics of data in periods of time.

The adaptive division module is configured to: divide, based on an average distribution matrix output by the time slice aggregation module, a spatial area managed by the system into grids of different sizes, where a size of the grid is determined by an amount and a density of data in the grid; and perform an adaptive spatial grid division operation to obtain an adaptive division result set.

The data routing module considering spatial proximity and load is configured to: compute a spatial routing policy of data or a service, distribute spatially adjacent data or services to a same server node, and ensure load balancing among nodes.

The dynamic update module is an optional module. Because the spatial-temporal distribution characteristic of the data changes with time, load balancing effect of an original routing or system division policy may be reduced.

This module periodically checks whether the routing or the division policy needs to be updated based on an update period set by a user.

A method for implementing a function of management based on spatial routing of a cluster system management apparatus provided in an embodiment of the application is: inputting historical data or spatial-temporal data collected by the system in real time, and outputting a partitioning policy or a routing result after the historical data or the spatial-temporal data collected by the system in real time is processed by the data pre-analysis module, the adaptive division module, the division and aggregation module, the data routing module considering spatial proximity and load, and the dynamic update module. Then, based on the result, the system performs partitioned storage on the data or performs the management based on spatial routing on the system. The implementation method includes the following operations:

> pre-analyze spatial-temporal data in a management area, identify a time slice with data tidal heterogeneity, compute the adaptive division threshold and the initial division level, and perform adaptive spatial grid division on the different time slices based on a computing result, to obtain the adaptive division result set; and
> then perform data routing based on the spatial proximity and the load, and generate the routing policy of the data or the service.

In addition, whether to dynamically adjust the routing policy may further be determined based on a time decay model and the update period set by the user.

It is easy to understand that the service data mentioned in this specification may be data of a plurality of services, for example, data of a service-type service, including but not limited to a positioning service request and a search service request; and data of a storage-type service, including but not limited to telecommunications service data. The historical service data mentioned in this specification means service data in several periods before a current period. For example, the historical service data is service data of a previous period or service data of two previous periods.

The following uses a positioning scenario as an example to describe in detail the method for implementing the function of management based on spatial routing of the cluster system management apparatus provided in an embodiment of the application.

In an embodiment, a positioning cloud service on a cloud is used as an example to describe in detail the method for implementing the function of management based on spatial routing of the cluster system management apparatus provided in an embodiment of the application. The positioning cloud service is deployed in a public cloud environment. With user authorization, when software that needs to enable a positioning function on a terminal device is invoked, the system can provide an outdoor or indoor positioning service for the user. An implementation process is as follows: A cloud server first receives a Wi-Fi positioning or fingerprint positioning request sent by the user, and sends the request to a positioning server with low resource overheads in a random routing manner by using a load balancing module. Then, cache of the positioning server is preferentially queried, and if the cache is hit, a query result is returned to a positioning algorithm module for location computing; or if the cache is missed, an online fingerprint database is queried, and a query result is returned to the positioning algorithm module for the location computing. The cluster system management apparatus provided in an embodiment of the application is located in the load balancing module, changes a load balancing manner from the random routing to area-based routing, and ensures load balancing of service requests, to resolve a problem that a cache hit rate of the current positioning server is low and an access bottleneck of the online database.

Figure 7:
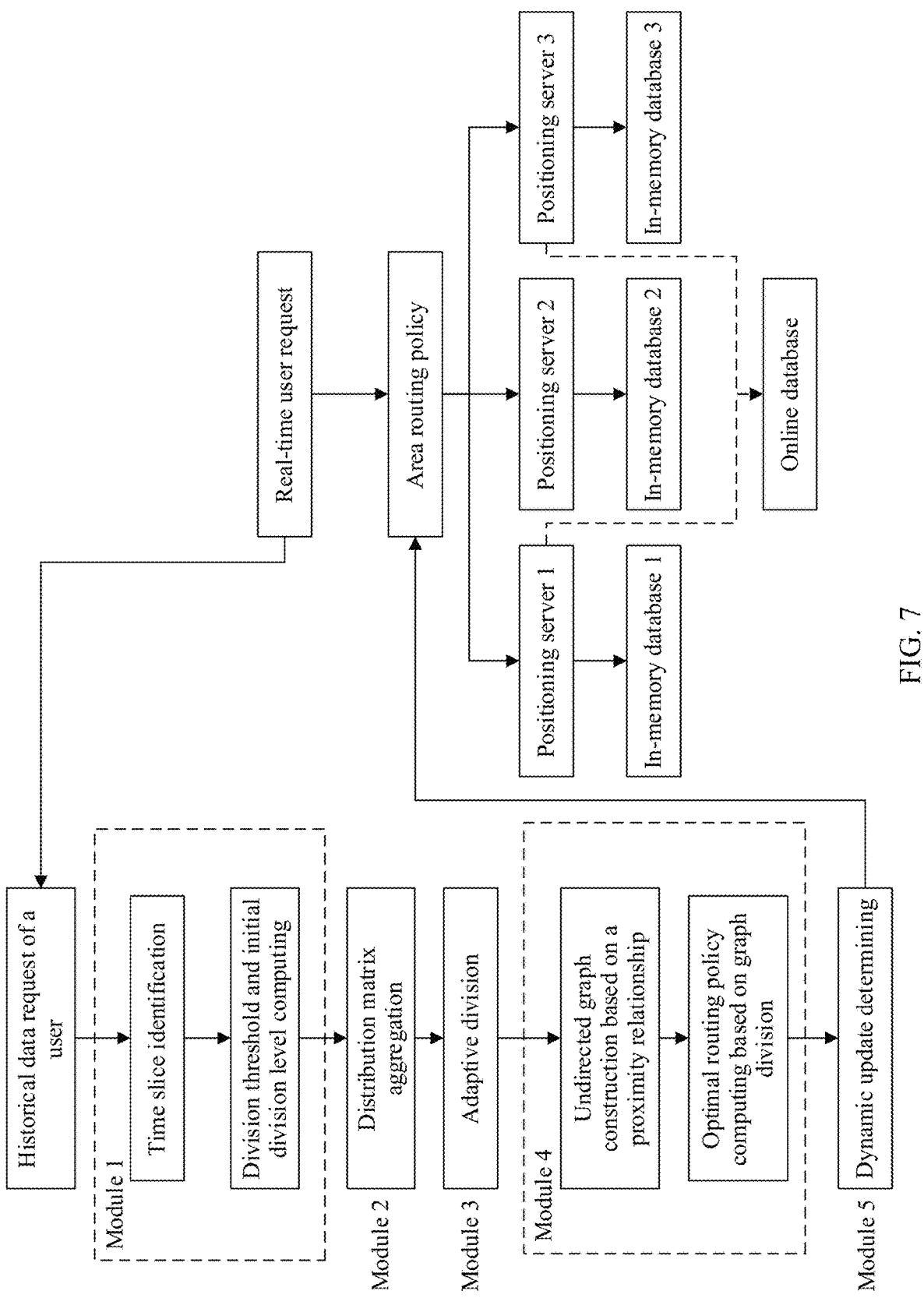
FIG. 7 is a schematic diagram of a routing process of a positioning request of a positioning system after a cluster system management apparatus is applied.

As shown in FIG. 7, historical data of a user positioning service request is used as an input and is processed by modules 1 to 5 of a cluster system management apparatus provided in an embodiment of the application to generate an area-based routing solution of the user positioning request. It is assumed that the entire system has n positioning servers, and the generated routing policy divides a management area of the system into n areas. Each positioning server processes a positioning service request of an area. A master node of the system determines a spatial area to which the user request belongs, and sends the positioning service request of the user to a corresponding positioning server for processing. An in-memory database is deployed on the positioning server. Based on a historical positioning service request status of the user, hot data is stored in the in-memory database as positioning service cache. During positioning processing, the positioning server queries the local in-memory database first. If a query result is obtained, the positioning server directly returns the query result without querying a bottom-layer online database. Because each positioning server caches only hot data that belongs to a management area of the positioning server, after the user positioning service request is routed based on the area, a cache hit ratio can be greatly improved, and access pressure of the bottom-layer database can be greatly reduced. In addition, a query speed of the in-memory database is much higher than that of a magnetic disk-based online database. According to this solution, with a same system scale, a system capacity and a processing capability are greatly improved, and user requests with a higher degree of parallelism can be processed.

The following describes in detail a method for implementing functions of the modules in the cluster system management apparatus provided in an embodiment of the application.

An input of a data pre-analysis module is statistics on service data in a historical period of time, for example, one week or one month, including time and location information of sending the service data.

In an example, service data generated in real time constantly updates the historical data.

The following operations are performed by the data pre-analysis module. Operation 1.1: Sample the historical service data and collect statistics on spatial distribution characteristics of the data based on time ranges. For example, the statistics are collected at a granularity of one hour. In an embodiment, uniform grid division is first performed on the space, statistics on amounts of data included in grids in the corresponding periods of time are collected, and distribution matrices are constructed based on the statistical value. A quantity of rows and columns in the distribution matrix corresponds to a quantity of rows and columns in the divided grid, and a matrix value is a statistical value of a quantity of requests in each grid. Certainly, in another embodiment, the distribution matrix may also be generated in a different time granularity or different space division manner. This is not limited in this application.

Operation 1.2: Identify a time slice with tidal heterogeneity. Distribution matrices of different periods of time indicate the spatial distribution characteristics of the data in the corresponding time ranges. Distribution matrices of all periods of time are standardized, and then a similarity of spatial distribution characteristics of adjacent periods of time can be evaluated by using a plurality of matrix similarity computing methods. For example, the similarity of the spatial distribution characteristics of the adjacent periods of time may be computed by using methods such as the jaccard correlation coefficient, the cosine similarity, the Pearson correlation coefficient, and the Euclidean distance. If a cosine similarity of distribution matrices of two periods of time is greater than a difference threshold, it is considered that the two periods of time have the tidal heterogeneity in a time dimension, and the two periods of time are different time slices; or if a cosine similarity of distribution matrices of two periods of time is less than a difference threshold, it is considered that there is no tidal heterogeneity, and the two periods of time belong to a same time slice. An average value of distribution matrices belonging to a same time slice is computed and is used as a distribution matrix in the time slice.

Operation 1.3: Compute an adaptive division threshold. The adaptive division threshold may be determined by using a plurality of methods. For example, the threshold may be determined based on a percentage of data in a grid after standardization to a total amount of data, may be determined based on a finally generated total quantity of grids, or may be set through human experience. Alternatively, a plurality of rounds of experiments are performed by using a control variable, to find a maximum value of a load balancing result and an algorithm efficiency gain. For a case in which load balancing needs to be performed on data storage, an embodiment provides a feasible threshold computing manner. In this case, the adaptive division threshold needs to be determined based on a characteristic of a bottom-layer storage model of a distributed database system, and an amount of data stored in a grid is set to not exceed a size of a minimum storage unit of the system for querying I/O scheduling at a time. Therefore, $T_{obj}=Size_{block}/S_{obj}$ is obtained. $Size_{block}$ indicates the minimum size of the storage unit for I/O scheduling at a time in the distributed database system, $S_{obj}$ indicates storage space occupied by each piece of point data after serialization, and $T_{obj}$ indicates the adaptive division threshold.

Operation 1.4: Compute an initial division level. A global initial division level is obtained through computing based on the adaptive division threshold in operation 1.3 and a spatial distribution-based level computing model. IBox is defined as a bounding rectangle of a data set, that is, a location of a management area of the system, and $(x_{min}, y_{min}, x_{max}, y_{max})$ indicates longitude and latitude boundaries of the bounding rectangle. It is assumed that a total quantity of points in the dataset is C, a threshold of the quantity of points computed by using the model is $T_{obj}$, and the initial division level to be solved is n.

It is considered that a corresponding level when data is uniformly distributed in space is used as the initial division level, that is, $f(n)=C/T_{obj}$, where $f(n)$ indicates a quantity of grids in which space divided at an $n^{th}$ level intersects with IBox, that is, $f(n)=IBoxINum_{grid}(n)$.

On the basis of globally uniform grid division, a length L and a width W of the spatial grid divided at the $n^{th}$ layer are respectively:

$$L = [180 - (-180)]/2^n = 360/2^n, \text{ and } W = [90 - (-90)]/2^n = 180/2^n.$$

In this case, the quantity of grids in which the space divided at the $n^{th}$ level intersects with IBox is:

$$f(n) = \left[(x_{max} - x_{min})/L\right] * \left[(y_{max} - y_{min})/W\right]$$

Therefore, $C/T_{obj}=[2^n(x_{max}-x_{min})/360]*[2^n(y_{max}-y_{min})/180]$ is obtained.

The initial division level n may be obtained through computing according to the foregoing formula, and the initial division level n obtained through computing is used as an initial level of adaptive spatial grid division.

In a distribution matrix aggregation module, distribution matrices corresponding to different time slices are aggregated, to form average representation of data distribution in a time span of the entire dataset, so as to ensure that good effect can be achieved for data load balancing in the time ranges. To obtain a theoretically optimal aggregation model, an accuracy is used to express a sum of differences between an aggregated matrix C and the distribution matrices of the time slices. A higher accuracy indicates that the aggregated matrix C is optimal. There are n time slices, and a distribution matrix corresponding to each time slice is indicated by $A_n$. $w_n$ indicates a weight of data of an $n^{th}$ time slice, and an expression of the accuracy is as follows:

$$Accuracy = 1 - \sqrt{\sum_n \left(\sum_i \sum_j w_n * (nor(C) - nor(A_n))^2_{i,j}\right)},$$

where
  nor(A) indicates normalizing the matrix, and a formula of computation of nor(A) is as follows:

$$nor(A) = A/\sum_i \sum_j A_{i,j}$$

To obtain an initial distribution matrix C with a highest accuracy in theory, a maximum value of the accuracy is computed. After mathematical derivation, it can be concluded that only when C satisfies the following formula, the maximum value of the accuracy is obtained, that is, when the maximum value of the accuracy is obtained, the aggregated matrix nor(C) is $$nor(C) = \frac{w_1 \, nor(A_1) + w_2 nor(A_2) + \ldots + w_n nor(A_n)}{w_1 + w_2 + \ldots + w_n}$$

The following operations are performed by an adaptive division module.

Operation 3.1: Perform initial spatial grid division on the data based on the initial division level, and collect statistics on amounts of data in initial spatial grids.

Figures 8, 9:
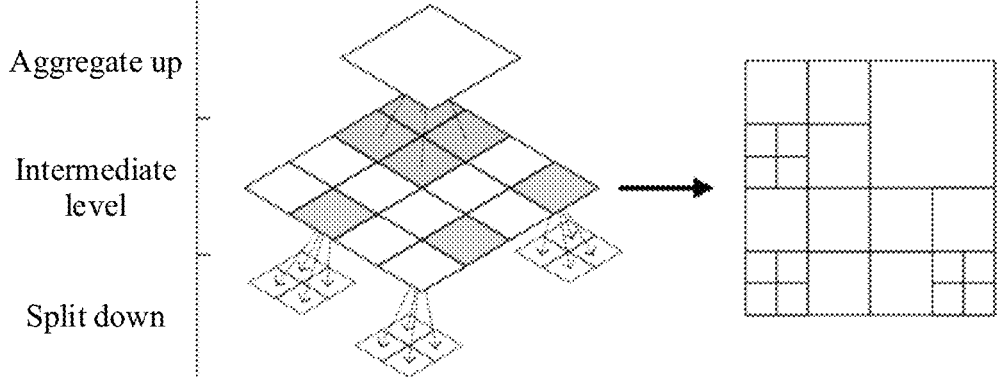
FIG. 8 is a schematic diagram of an adaptive spatial grid obtained through adaptive division based on an adaptive division threshold and an initial spatial grid.
FIG. 9 is a schematic diagram of performing division on historical service data by an adaptive spatial grid.

Operation 3.2: Traverse the initial spatial grids, determine, based on the adaptive division threshold obtained by the data pre-analysis module, whether a current grid needs to be subdivided into a next level or aggregated to a previous level, and stop performing the operation until the amounts of data in the grids satisfy an adaptive division threshold condition or the amounts of data in the grids exceed an amount. Finally, the space is divided into grid areas of different scales, that is, division of an adaptive spatial grid is obtained (refer to FIG. 8 and FIG. 9).

The following operations are performed by a data routing module considering spatial proximity and load.

Figure 10:
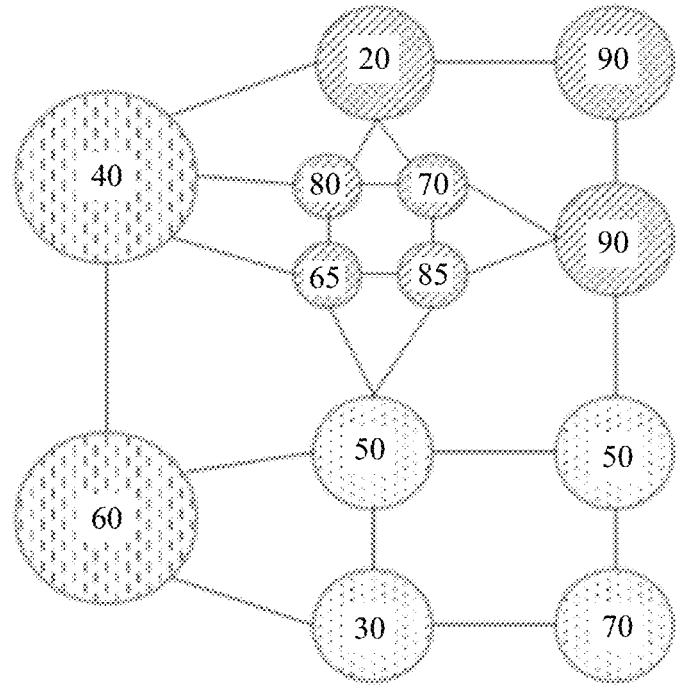
FIG. 10 is an undirected graph based on a proximity relationship.

Operation 4.1: Construct an undirected graph based on a proximity relationship. The multi-scale adaptive spatial grid division result determined in the adaptive division module is abstracted as an undirected graph structure, each grid is used as a node, a weight of the node is an equivalent amount of data in the grid, and a proximity relationship between grids is used as an edge, a weight of the edge corresponds to a distance between grids (refer to FIG. 10).

Operation 4.2: Construct an adjacency matrix of the undirected graph based on the proximity relationship.

Operation 4.3: According to a graph division method, group the adaptive spatial grids to achieve balanced amount of data of each group after the division, to implement data routing. A quantity of groups is determined based on a user requirement and may be set to a quantity of sub-clusters (each sub-cluster is responsible for a computing task in a spatial area) in a current cluster, or may be less than the quantity of sub-clusters (a plurality of sub-clusters are responsible for a computing task in a spatial area). Finally, a node ID number corresponding to each adaptive spatial grid is output. One node ID corresponds to one cluster node.

Figure 11:
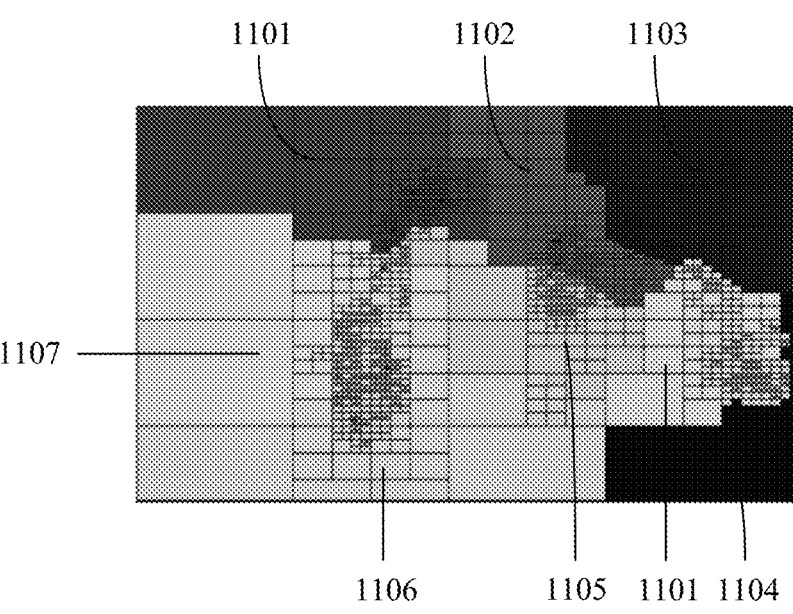
FIG. 11 is a schematic diagram of a routing result.

For example, in FIG. 11, the adaptive spatial grids are divided into seven sub-areas based on the proximity relationship and balanced amount of data, and IDs, such as 1101 to 1107 in FIG. 11, of corresponding cluster nodes are marked on the plurality of sub-areas, so that after a management node receives service data, the service data of the sub-areas is routed to corresponding cluster nodes for processing. For example, if the service data received by the management node is sent from an area 1, and an ID marked in the area 1 is 1106, the service data is routed to a cluster node whose ID is 1106 for processing.

In an embodiment, operation 4.4 is further included. This operation is used only in a scenario in which two-phase aggregation needs to be used to further improve data/service allocation balance degree. In some scenarios, there is no strong requirement on aggregation of the spatial areas managed by the cluster nodes, that is, one compute node is not required to manage only one sub-area, and can manage a plurality of non-intersecting sub-areas. In this scenario, the quantity of the division groups generated in operation 4.3 is greater than a quantity of compute nodes, and secondary aggregation is performed on the division in operation 4.3 by using the two-phase aggregation method. The two-phase aggregation uses the set partition algorithm to perform grouping, aggregation, and optimization in the result of operation 4.3, to ensure that differences in amounts of data/service quantities between groups after aggregation are minimal. In a possible embodiment, statistics on average amounts of data/service quantities of time slices (a granularity of the time slice may be determined based on a requirement, for example, one day may be a granularity of a time slice or one hour may be a granularity of a time slice) in the groups generated in operation 4.3 may be collected. The average amounts of data of the groups are constructed as a set, and the set is grouped based on the Karmarkar-Karp algorithm. For example, the cluster system has three compute nodes. In operation 4.3, nine divided sub-areas are generated by using the graph division algorithm. Statistics on amounts of data included in the nine sub-areas in different time slices are collected, and average values are computed, to construct a set $\{N1, \ldots, N9\}$. The set $\{N1, \ldots, N9\}$ is divided into three groups by using the Karmarkar-Karp algorithm, differences in the amounts of data between the groups are minimized, and a result output is $\{\{N1, N4\}, \{N2, N5, N6, N9\}, \text{ and } \{N3, N7, N8\}\}$. Then, data/services of partitions 1 and 4 are sent to a compute node 21 for processing, data/services of partitions 2, 5, 6, and 9 are sent to a compute node 22 for processing, and data/services of partitions 3, 7, and 8 are sent to a compute node 23 for processing.

A dynamic update module periodically verifies a load balancing routing result based on an update period set by the user or a default update period, to determine whether to update the routing policy. For example, the following operations are performed by the dynamic update module.

Operation 5.1: Assume that the user sets the update period to one month, and recompute a new aggregated distribution matrix $C_{new}$ based on historical data of a previous month.

Operation 5.2: Compute a similarity. It is assumed that an original aggregated distribution matrix is $C_{old}$, and after the two distribution matrices $C_{old}$ and $C_{new}$ are standardized, the similarity between $C_{old}$ and $C_{new}$ is computed by using a Frobenius norm of $C_{old}$ and $C_{new}$.

Operation 5.3: Determine a threshold. If the similarity exceeds a preset threshold $\varepsilon$, it indicates that a significant change occurs in data distribution. In this case, adaptive division and routing result partitioning need to be recomputed based on new data distribution. In this case, the routing policy is updated. If the similarity does not exceed the threshold $\varepsilon$, the previous policy is continued to be used. Setting of the threshold $\varepsilon$ depends on an actual application requirement.

FIG. 12 is a schematic flowchart of a cluster system management method according to an embodiment of this application. The method may be applied to the management node 10 in the cluster system shown in FIG. 2, or the cluster system management apparatus shown in FIG. 6, to implement management based on spatial routing of the cluster system. As shown in FIG. 12, the method at least includes operation S1201 to operation S1204.

Operation S1201: Obtain historical service data.

The historical service data is service data in several periods before a current period. For example, when the period is one month, the historical service data may be service data in a previous month or service data in previous three months. A quantity of previous periods may be determined based on a requirement. This is not limited in this application.

In an example, the historical data is stored in a bottom-layer database, and the management node obtains the historical service data by invoking the historical service data from the bottom-layer database. For example, the management node sends invoking request information of the historical service data to the bottom-layer database, and the bottom-layer database responds to the request and sends the historical service data to the management node.

It is easy to understand that all service data has space and time attributes, that is, the service data carries location and time information of the service data. For example, the service data may include a positioning service request, and the positioning service request carries location and time information for sending the request.

Operation S1202: Determine a spatial-temporal distribution characteristic of the historical service data.

For example, to reduce an amount of data processed by the management node, random sampling is performed on the obtained historical service data, to obtain sampled historical service data, statistics on the historical service data obtained through sampling in time ranges are collected, and spatial distribution characteristics of the historical service data in the time ranges are obtained based on the time attribute of the service data. For example, the statistics are collected at a granularity of one hour. First, uniform grid division is first performed on space of an area managed by the cluster system, statistics on amounts of data included in grids in the corresponding periods of time are collected, and spatial distribution matrices of the historical service data in the time ranges are constructed based on the statistical value. A quantity of rows and columns in the distribution matrix corresponds to a quantity of rows and columns in the divided grid, and a matrix value is a statistical value of a quantity of requests in each grid. The spatial distribution characteristics of the historical service data in the periods of time indicate the spatial distribution characteristics of the historical service data in the periods of time.

The periods of time may be referred to as time slices, and the spatial distribution matrices of the historical service data in the periods of time are referred to as spatial distribution matrices of the historical service data in the time slices.

Heterogeneity of the time slice is identified. In an embodiment, for ease of comparison, standardization processing is first performed on the distribution matrices of the historical service data in the time slices, that is, normalization processing is performed on the distribution matrices in the time slices, and normalized distribution matrices of the historical service data in the time slices obtained after the normalization processing are determined. Then, similarity computing (for example, a cosine similarity) is separately performed on the distribution matrices of the historical service data in the time slices after the normalization processing. When the cosine similarity of distribution matrices of the historical service data in two time slices is greater than a preset threshold, the two time slices belong to different types of time slices. When the cosine similarity of distribution matrices of the historical service data in two time slices is less than or equal to a preset threshold, the two time slices belong to a same type of time slice.

Based on the distribution matrices of the historical service data that belong to the same time slice, a distribution matrix of historical service data in the time slice is determined. In an example, an average value of distribution matrices of the historical service data in several time slices that belong to a same time slice is used as a distribution matrix of the historical service data in the time slice. For example, when a time slice at 6:00 a.m. and 7:00 a.m. and a time slice at 5:00 p.m. and 6:00 p.m. belong to a same type of time slice, an average value of a distribution matrix of the historical service data in the time slice at 6:00 a.m. and 7:00 a.m. and a distribution matrix of the historical service data in the time slice at 5:00 p.m. and 6:00 p.m. is computed and is used as a distribution matrix of the historical service data in the type of time slice.

Distribution matrices of the historical service data in time slices with the heterogeneity, that is, distribution matrices of the historical service data in a plurality of types of time slices, are aggregated, to obtain an aggregated distribution matrix, where the aggregated distribution matrix indicates a spatial-temporal distribution characteristic of the historical service data.

For a method for aggregating the distribution matrices of the historical service data in the plurality of types of time slices, refer to the foregoing method for determining nor(C) in the distribution matrix aggregation module. For brevity, details are not described herein again.

Operation S1203: Dividing a preset area into M sub-areas based on the spatial-temporal distribution characteristic of the historical service data.

The preset area is divided into the M sub-areas based on the spatial-temporal distribution characteristic of the historical service data and a spatial proximity relationship, so that distribution of the historical service data between the plurality of sub-areas is balanced, where M is an integer greater than 1, for example, M may be equal to 3.

In an embodiment, an adaptive division threshold is first determined. For a method of the adaptive threshold, refer to the foregoing description of operation 1.3 in the data pre-analysis module. For brevity, details are not described herein again.

Then, an initial division level is determined based on the adaptive division threshold and location information of the preset area. For a method for determining the initial division level, refer to the foregoing description of operation 1.4 in the data pre-analysis module. For brevity, details are not described herein again.

Spatial grid division of a level corresponding to the initial division level in a spatial distribution-based level computing model is determined based on the initial division level and the spatial distribution-based level computing model, where the spatial grid division is initial spatial grid division.

The initial spatial grid division is performed on the historical service data based on the initial spatial grid division, and statistics on amounts of data in initial spatial grids are collected.

The initial spatial grids are traversed, based on the adaptive division threshold obtained by the data pre-analysis module, whether a current grid needs to be subdivided into a next level or aggregated to a previous level is determined, and the operation is stopped performing until the amounts of data in the grids satisfy an adaptive division threshold condition or the amounts of data in the grids exceed an amount. Finally, the space is divided into grid areas of different scales, and division of an adaptive spatial grid is obtained.

The preset area is divided into the plurality of sub-areas based on proximity relationships of sub-grids in the adaptive spatial grid and amounts of data in the sub-grids in the adaptive spatial grid. For a division method, refer to the foregoing description of operation S4.1 to operation S4.3 in the data routing module considering spatial proximity and load. For brevity, details are not described herein again.

Operation S1204: Determine correspondences between the M sub-areas and N compute nodes, and route service data of sub-areas in the M sub-areas to corresponding compute nodes for processing.

For example, M may be equal to N, that is, a quantity of M sub-areas may be the same as a quantity of N compute nodes, and a plurality of compute nodes may one-to-one correspond to a plurality of sub-areas, that is, one compute node is responsible for processing service data of one sub-area. In other words, the management node distributes service data of a sub-area to a corresponding compute node, that is, routes the service data to the compute node responsible for the sub-area for processing.

M may be less than N, that is, the quantity of M sub-areas is less than the quantity of N compute nodes. In this case, the N compute nodes are divided into M sub-clusters, and the M sub-clusters one-to-one correspond to the M sub-areas, that is, one sub-cluster is responsible for processing service data of one sub-area.

M may be greater than N, that is, the quantity of M sub-areas is greater than the quantity of N compute nodes. In this case, the M sub-areas are divided into N groups of sub-areas, and the N compute nodes one-to-one correspond to the N groups of sub-areas, that is, one compute node is responsible for processing service data of one group of sub-areas. In other words, one compute node may process service data of two or more sub-areas.

For a method for dividing the M sub-areas into the N groups of sub-areas, refer to the foregoing description of operation 4.4. For brevity, details are not described herein again.

In another example, the method further includes operation S1205: Determine, based on a spatial-temporal distribution characteristic of historical service data of the current period and a spatial-temporal distribution characteristic of historical service data of a previous period, whether the division of the preset area needs to be updated.

For a method of operation S1205, refer to the foregoing description of operation 5.1 to operation 5.3 in the dynamic update module. For brevity, details are not described herein again.

According to the cluster system provided in an embodiment of the application, a distribution rule of the historical service data is analyzed based on the two dimensions of time and space, to implement a global and relatively optimal and unique partitioning and routing solution in a long period. An application system may adjust a system architecture based on the result, to form a new architecture of management based on spatial routing, improve a system expansion capability, and multiply system performance.

According to the cluster system management method provided in an embodiment of the application, on the one hand, according to a load balancing method that considers both a data space dimension and a time dimension, the global and relatively optimal service division and routing solution can be obtained in time ranges and areas with significantly different human activity rules. An optimal strategy of federated management based on spatial and area routing is output, so that a complex system is divided into a plurality of independent management units by geographical area, balanced storage/computing load of each management unit is ensured, and a problem of distributed load balancing of a time-varying urban flow is resolved. On the other hand, a stable partitioning and routing solution in a long period can be formed based on a user requirement, which is not limited to load balancing of a single batch of data, so that extra computing overheads incurred by partition adjustment and frequent architecture adjustment are avoided. In addition, a space change problem based on spatial-filling curve division is resolved, which further enhances spatial proximity of data on a same node.

Based on a same concept as the foregoing method embodiment, an embodiment of this application further provides a cluster system management apparatus 1300. The cluster system management apparatus 1300 includes units or means for implementing the steps of the cluster system management method shown in FIG. 12.

FIG. 13 is a schematic diagram of a structure of a cluster system management apparatus according to an embodiment of this application. As shown in FIG. 13, the cluster system management apparatus 1300 at least includes:

an obtaining module 1301, configured to obtain historical service data, where the historical service data is service data in several periods before a current period;

a determining module 1302, configured to determine a spatial-temporal distribution characteristic of the historical service data;

a division module 1303, configured to divide a preset area into M sub-areas based on the spatial-temporal distribution characteristic of the historical service data, where distribution of the historical service data between the M sub-areas is balanced; and a routing module 1304, configured to: determine correspondences between the M sub-areas and N compute nodes and route service data of sub-areas in the M sub-areas to corresponding compute nodes for processing.

In an embodiment, the determining module 1302 is configured to: determine, based on spatial distribution characteristics of service data in a plurality of periods of time in the historical service data, spatial distribution matrices of service data respectively corresponding to a plurality of time slices, where adjacent periods of time in the plurality of periods of time are continuous; and determine the spatial-temporal distribution characteristic of the historical service data based on the spatial distribution matrices of the service data respectively corresponding to the plurality of time slices.

In an embodiment, the determining the spatial-temporal distribution characteristic of the historical service data based on the spatial distribution matrices of the service data respectively corresponding to the plurality of time slices includes:

performing normalization on spatial distribution matrices of service data corresponding to time slices in the plurality of time slices, to determine normalized spatial distribution matrices of the service data corresponding to the time slices;

dividing the plurality of time slices into a plurality of types of time slices based on a similarity between the normalized spatial distribution matrices of the service data corresponding to the time slices; and performing aggregation on the normalized spatial distribution matrices of the service data corresponding to the plurality of types of time slices, to determine an aggregated distribution matrix of the plurality of types of time slices, where the aggregated distribution matrix of the plurality of types of time slices indicates the spatial-temporal distribution characteristic of the historical service data.

In an embodiment, the division module 1303 is configured to divide the preset area into the plurality of sub-areas based on the spatial-temporal distribution characteristic of the historical service data and a spatial proximity relationship, where the distribution of the historical service data between the plurality of sub-areas is balanced.

In an embodiment, the dividing the preset area into the plurality of sub-areas based on the spatial-temporal distribution characteristic of the historical service data and a spatial proximity relationship includes:

determining an adaptive division threshold;

performing initial spatial grid division on the historical service data based on the adaptive division threshold;

determining amounts of data in sub-grids in the initial spatial grid based on the spatial-temporal distribution characteristic of the historical service data;

traversing the sub-grids in the initial spatial grid, and performing subdivision or aggregation on the sub-grids in the initial spatial grid based on the amounts of data in the sub-grids in the initial spatial grid and the adaptive division threshold, to determine division of an adaptive spatial grid of the historical service data; and dividing the preset area into the M sub-areas based on proximity relationships of sub-grids in the adaptive spatial grid and amounts of data in the sub-grids in the adaptive spatial grid, where distribution of amounts of data in the M sub-areas is balanced.

In an embodiment, the performing initial spatial grid division on the historical service data based on the adaptive division threshold includes:

determining an initial division level based on the adaptive division threshold and location information of the preset area; and performing the initial spatial grid division on the historical service data based on the initial division level and a spatial distribution-based level computing model.

In an embodiment, the dividing the preset area into the M sub-areas based on proximity relationships of sub-grids in the adaptive spatial grid and amounts of data in the sub-grids in the adaptive spatial grid includes:

determining, based on the division of the adaptive spatial grid of the historical service data, an undirected graph corresponding to the adaptive spatial grid, where nodes of the undirected graph are determined based on the sub-grids in the adaptive spatial grid, weights of the nodes are determined based on the amounts of data in the sub-grids in the adaptive spatial grid, edges connected to adjacent nodes are determined based on the proximity relationships of the sub-grids in the adaptive spatial grid, and weights of the edges are determined based on distances of adjacent sub-grids in the adaptive spatial grid;

determining an adjacency matrix of the undirected graph based on the undirected graph corresponding to the adaptive spatial grid; and dividing the preset area into the M sub-areas based on the adaptive spatial grid and the adjacency matrix of the undirected graph, where the distribution of the amounts of data in the M sub-areas is balanced.

In an embodiment, the routing module 1304 is configured to: determine that N is greater than or equal to M; and divide the N compute nodes into M sub-clusters, where the M sub-clusters one-to-one correspond to the M sub-areas.

In an embodiment, the routing module 1304 is configured to:

determine that N is less than M;

collect statistics on average amounts of service data of the sub-areas in the M sub-areas in a plurality of periods of time; and divide the M sub-areas into N groups of sub-areas with the aim of minimizing difference values in the average amounts of service data between groups, where the N groups of sub-areas one-to-one correspond to the N compute nodes.

In an embodiment, the apparatus further includes: an update module 1305, configured to determine, based on a spatial-temporal distribution characteristic of historical service data of the current period and a spatial-temporal distribution characteristic of historical service data of a previous period, whether the division of the preset area needs to be updated.

In an embodiment, the update module 1305 is configured to: compare whether a similarity between the spatial-temporal distribution characteristic of the historical service data of the current period and the spatial-temporal distribution characteristic of the historical service data of the previous period is greater than a preset threshold; and if the similarity between the spatial-temporal distribution characteristic of the historical service data of the current period and the spatial-temporal distribution characteristic of the historical service data of the previous period is greater than the preset threshold, determine that the division of the preset area needs to be updated, or if the similarity between the spatial-temporal distribution characteristic of the historical service data of the current period and the spatial-temporal distribution characteristic of the historical service data of the previous period is not greater than the preset threshold, determine that the division of the preset area does not need to be updated.

The cluster system management apparatus 1300 accordingly perform the method described in embodiments of this application, and the foregoing and other operations and/or functions of the modules in the cluster system management apparatus 1300 are separately used to implement the corresponding procedures in the methods in FIG. 12. For brevity, details are not described herein again.

Figure 14:
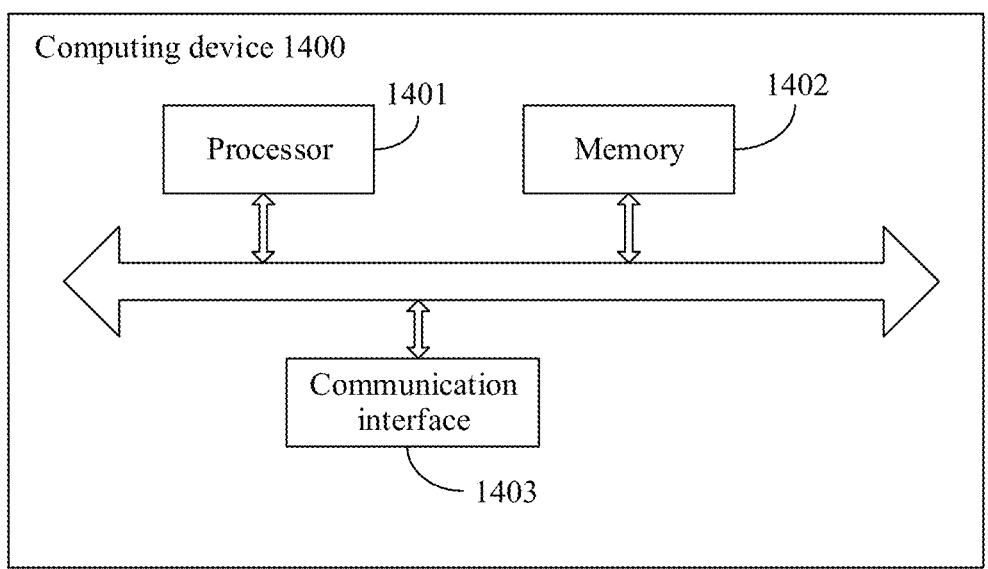
FIG. 14 is a schematic diagram of a structure of a computing device according to an embodiment of this application.

FIG. 14 is a schematic diagram of a structure of a computing device according to an embodiment of this application.

As shown in FIG. 14, a computing device 1400 shown in FIG. 14 may include a processor 1401, a memory 1402, and a communication interface 1403. The processor 1401, the memory 1402, and the communication interface 1403 are communicatively connected through a bus, or may implement communication by using another means such as wireless transmission. The communication interface 1403 is configured to communicate with another communication device, for example, receive a load request sent by a terminal in a management area. The memory 1402 stores executable program code, and the processor 1401 may invoke the program code stored in the memory 1402 to perform the cluster system management method in the foregoing method embodiment.

It should be understood that, in an embodiment of the application, the processor 1401 may be a central processing unit CPU, or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, any conventional processor, or the like.

The memory 1402 may include a read-only memory and a random access memory, and provide instructions and data for the processor 1401. The memory 1402 may further include a nonvolatile random access memory. For example, the memory 1402 may further store a database, and the database has historical service data.

The memory 1402 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be understood that the computing device 1400 according to an embodiment of the application may correspond to the cluster system management apparatus in embodiments of this application and may correspond to the corresponding body that performs the method shown in FIG. 12 in embodiments of this application. In addition, the foregoing and other operations and/or functions of the components in the computing device 1400 are separately used to implement the corresponding procedures in the methods in FIG. 12. For brevity, details are not described herein again.

An embodiment of this application provides a computer storage medium, including computer instructions, and when the computer instructions are executed by a processor, any one of the foregoing methods is implemented.

An embodiment of this application provides a computer program product. When the computer program product runs on a processor, any one of the foregoing methods is implemented.

One of ordinary skilled in the art should be aware that units and algorithm steps in the examples described with reference to embodiments disclosed in this specification can be implemented by electronic hardware, computer software, or a combination of computer software and electronic hardware. To clearly illustrate interchangeability of hardware and software, the foregoing has generally described compositions and steps of the examples based on functions. Whether the functions are performed by hardware or software depends on particular applications and design constraints of the technical solutions. One of ordinary skilled in the art may use different methods to implement the described functions for each particular application, but it should not be considered that the implementation goes beyond the scope of this application.

The steps of the methods or algorithms described in embodiments disclosed in this specification may be implemented by hardware and a software module executed by the processor or a combination of hardware and a software module executed by the processor. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing implementations, the objective, technical solutions, and beneficial effect of this application are further described in detail. It should be understood that the foregoing descriptions are merely implementations of this application, but are not intended to limit the protection scope of this application. Any modification, equivalent replacement, or improvement made without departing from the spirit and principle of this application should fall within the protection scope of this application.

What is claimed is:

1. A cluster system management method used on a management node, comprising:

obtaining historical service data, wherein the historical service data is service data in several periods before a current period, wherein a cluster system comprises the management node and N compute nodes, and wherein the cluster system is responsible for processing service data in a preset area, N is an integer greater than 1;

obtaining a spatial-temporal distribution characteristic of the historical service data;

dividing the preset area into M sub-areas based on the spatial-temporal distribution characteristic of the historical service data, wherein a difference value in distribution of the historical service data between the M sub-areas is less than a preset threshold, and M is an integer greater than 1; and obtaining correspondences between the M sub-areas and the N compute nodes, and routing service data of sub-areas in the M sub-areas to corresponding compute nodes for processing.

2. The management method according to claim 1, wherein the obtaining the spatial-temporal distribution characteristic of the historical service data comprises:

obtaining, based on spatial distribution characteristics of service data in a plurality of periods of time in the historical service data, spatial distribution matrices of service data respectively corresponding to a plurality of time slices, wherein adjacent periods of time in the plurality of periods of time are continuous; and obtaining the spatial-temporal distribution characteristic of the historical service data based on the spatial distribution matrices of the service data respectively corresponding to the plurality of time slices.

3. The management method according to claim 2, wherein the obtaining the spatial-temporal distribution characteristic of the historical service data based on the spatial distribution matrices of the service data respectively corresponding to the plurality of time slices comprises:

performing normalization on the spatial distribution matrices of service data corresponding to time slices in the plurality of time slices, to determine normalized spatial distribution matrices of the service data corresponding to the time slices;

dividing the plurality of time slices into a plurality of types of time slices based on a similarity between the normalized spatial distribution matrices of the service data corresponding to the time slices; and performing aggregation on the normalized spatial distribution matrices of the service data corresponding to the plurality of types of time slices, to determine an aggregated distribution matrix, wherein the aggregated distribution matrix indicates the spatial-temporal distribution characteristic of the historical service data.

4. The management method according to claim 1, wherein the dividing the preset area into the M sub-areas based on the spatial-temporal distribution characteristic of the historical service data comprises:

dividing the preset area into the M sub-areas based on the spatial-temporal distribution characteristic of the historical service data and a spatial proximity relationship, wherein the difference value in the distribution of the historical service data between the M sub-areas is less than the preset threshold.

5. The management method according to claim 4, wherein the dividing the preset area into the M sub-areas based on the spatial-temporal distribution characteristic of the historical service data and the spatial proximity relationship comprises:

obtaining an adaptive division threshold;

performing initial spatial grid division on the historical service data based on the adaptive division threshold;

obtaining amounts of data in sub-grids in an initial spatial grid based on the spatial-temporal distribution characteristic of the historical service data;

traversing the sub-grids in the initial spatial grid, and performing subdivision or aggregation on the sub-grids in the initial spatial grid based on the amounts of data in the sub-grids in the initial spatial grid and the adaptive division threshold, to determine division of an adaptive spatial grid of the historical service data; and dividing the preset area into the M sub-areas based on proximity relationships of sub-grids in the adaptive spatial grid and amounts of data in the sub-grids in the adaptive spatial grid, wherein distribution of amounts of data in the M sub-areas is balanced.

6. The management method according to claim 5, wherein the performing initial spatial grid division on the historical service data based on the adaptive division threshold comprises:

obtaining an initial division level based on the adaptive division threshold and location information of the preset area; and performing the initial spatial grid division on the historical service data based on the initial division level and a spatial distribution-based level computing model.

7. The management method according to claim 5, the dividing the preset area into the M sub-areas based on the proximity relationships of sub-grids in the adaptive spatial grid and amounts of data in the sub-grids in the adaptive spatial grid comprises:

obtaining, based on the division of the adaptive spatial grid of the historical service data, an undirected graph corresponding to the adaptive spatial grid, wherein nodes of the undirected graph are determined based on the sub-grids in the adaptive spatial grid, weights of the nodes are determined based on the amounts of data in the sub-grids in the adaptive spatial grid, edges connected to adjacent nodes are determined based on the proximity relationships of the sub-grids in the adaptive spatial grid, and weights of the edges are determined based on distances of adjacent sub-grids in the adaptive spatial grid;

obtaining an adjacency matrix of the undirected graph based on the undirected graph corresponding to the adaptive spatial grid; and dividing the preset area into the M sub-areas based on the adaptive spatial grid and the adjacency matrix of the undirected graph, wherein a difference value in the distribution of the amounts of data between the M sub-areas is less than the preset threshold.

8. The management method according to claim 1, wherein the obtaining correspondences between the M sub-areas and the N compute nodes comprises:

determining that N is greater than or equal to M; and dividing the N compute nodes into M sub-clusters, wherein the M sub-clusters one-to-one correspond to the M sub-areas.

9. The management method according to claim 1, wherein the obtaining correspondences between the M sub-areas and the N compute nodes comprises:

determining that N is less than M;

collecting statistics on average amounts of service data of the sub-areas in the M sub-areas in a plurality of periods of time; and dividing the M sub-areas into N groups of sub-areas to minimize difference values in the average amounts of service data between groups, wherein the N groups of sub-areas one-to-one correspond to the N compute nodes.

10. The management method according to claim 1, comprising:

determining, based on a spatial-temporal distribution characteristic of historical service data of the current period and a spatial-temporal distribution characteristic of historical service data of a previous period, whether the division of the preset area needs to be updated.

11. The management method according to claim 10, wherein the determining whether the division of the preset area needs to be updated comprises:

comparing whether a similarity between the spatial-temporal distribution characteristic of the historical service data of the current period and the spatial-temporal distribution characteristic of the historical service data of the previous period is greater than a preset threshold; and if the similarity between the spatial-temporal distribution characteristic of the historical service data of the current period and the spatial-temporal distribution characteristic of the historical service data of the previous period is greater than the preset threshold, determining that the division of the preset area needs to be updated, or if the similarity between the spatial-temporal distribution characteristic of the historical service data of the current period and the spatial-temporal distribution characteristic of the historical service data of the previous period is not greater than the preset threshold, determining that the division of the preset area does not need to be updated.

12. The management method according to claim 1, wherein compute nodes in the plurality of compute nodes cache data related to a service in sub-areas corresponding to the compute nodes.

13. A cluster system management apparatus applied to a cluster system, comprising:

a processor; and a memory coupled to the processor to store instructions, which when executed by the processor, cause the processor to perform operations, the operations comprising:

obtaining historical service data, wherein the historical service data is service data in several periods before a current period, wherein a cluster system comprises a management node and N compute nodes, and wherein the cluster system is responsible for processing service data in a preset area, N is an integer greater than 1;

obtaining a spatial-temporal distribution characteristic of the historical service data;

dividing the preset area into M sub-areas based on the spatial-temporal distribution characteristic of the historical service data, wherein a difference value in distribution of the historical service data between the M sub-areas is less than a preset threshold, and M is an integer greater than 1; and obtaining correspondences between the M sub-areas and the N compute nodes, and routing service data of sub-areas in the M sub-areas to corresponding compute nodes for processing.

14. The apparatus according to claim 13, wherein obtaining the spatial-temporal distribution characteristic of the historical service data comprises:

obtaining, based on spatial distribution characteristics of service data in a plurality of periods of time in the historical service data, spatial distribution matrices of service data respectively corresponding to a plurality of time slices, wherein adjacent periods of time in the plurality of periods of time are continuous; and obtaining the spatial-temporal distribution characteristic of the historical service data based on the spatial distribution matrices of the service data respectively corresponding to the plurality of time slices.

15. The apparatus according to claim 14, wherein the obtaining the spatial-temporal distribution characteristic of the historical service data based on the spatial distribution matrices of the service data respectively corresponding to the plurality of time slices comprises:

performing normalization on spatial distribution matrices of service data corresponding to time slices in the plurality of time slices, to determine normalized spatial distribution matrices of the service data corresponding to the time slices;

dividing the plurality of time slices into a plurality of types of time slices based on a similarity between the normalized spatial distribution matrices of the service data corresponding to the time slices; and performing aggregation on the normalized spatial distribution matrices of the service data corresponding to the plurality of types of time slices, to determine an aggregated distribution matrix, wherein the aggregated distribution matrix indicates the spatial-temporal distribution characteristic of the historical service data.

16. The apparatus according to claim 13, wherein the dividing the preset area into the M sub-areas based on the spatial-temporal distribution characteristic of the historical service data comprises:

dividing the preset area into the M sub-areas based on the spatial-temporal distribution characteristic of the historical service data and a spatial proximity relationship, wherein the difference value in the distribution of the historical service data between the M sub-areas is less than the preset threshold.

17. The apparatus according to claim 16, wherein the dividing the preset area into the M sub-areas based on the spatial-temporal distribution characteristic of the historical service data and the spatial proximity relationship comprises:

obtaining an adaptive division threshold;

performing initial spatial grid division on the historical service data based on the adaptive division threshold;

obtaining amounts of data in sub-grids in an initial spatial grid based on the spatial-temporal distribution characteristic of the historical service data;

traversing the sub-grids in the initial spatial grid, and performing subdivision or aggregation on the sub-grids in the initial spatial grid based on the amounts of data in the sub-grids in the initial spatial grid and the adaptive division threshold, to determine division of an adaptive spatial grid of the historical service data; and dividing the preset area into the M sub-areas based on proximity relationships of sub-grids in the adaptive spatial grid and amounts of data in the sub-grids in the adaptive spatial grid, wherein distribution of amounts of data in the M sub-areas is balanced.

18. The apparatus according to claim 17, wherein the performing initial spatial grid division on the historical service data based on the adaptive division threshold comprises:

obtaining an initial division level based on the adaptive division threshold and location information of the preset area; and performing the initial spatial grid division on the historical service data based on the initial division level and a spatial distribution-based level computing model.

19. The apparatus according to claim 17, wherein the dividing the preset area into the M sub-areas based on proximity relationships of sub-grids in the adaptive spatial grid and amounts of data in the sub-grids in the adaptive spatial grid comprises:

obtaining, based on the division of the adaptive spatial grid of the historical service data, an undirected graph corresponding to the adaptive spatial grid, wherein nodes of the undirected graph are determined based on the sub-grids in the adaptive spatial grid, weights of the nodes are determined based on the amounts of data in the sub-grids in the adaptive spatial grid, edges connected to adjacent nodes are determined based on the proximity relationships of the sub-grids in the adaptive spatial grid, and weights of the edges are determined based on distances of adjacent sub-grids in the adaptive spatial grid;

obtaining an adjacency matrix of the undirected graph based on the undirected graph corresponding to the adaptive spatial grid; and dividing the preset area into the M sub-areas based on the adaptive spatial grid and the adjacency matrix of the undirected graph, wherein a difference value in the distribution of the amounts of data between the M sub-areas is less than the preset threshold.

20. The apparatus according to claim 13, wherein the obtaining correspondences between the M sub-areas and the N compute nodes comprises:

determining that N is greater than or equal to M; and dividing the N compute nodes into M sub-clusters, wherein the M sub-clusters one-to-one correspond to the M sub-areas.

21. The apparatus according to claim 13, wherein the obtaining correspondences between the M sub-areas and the N compute nodes comprises:

determining that N is less than M;

collecting statistics on average amounts of service data of the sub-areas in the M sub-areas in a plurality of periods of time; and dividing the M sub-areas into N groups of sub-areas to minimize difference values in the average amounts of service data between groups, wherein the N groups of sub-areas one-to-one correspond to the N compute nodes.

22. The apparatus according to claim 13, the operations further comprising:

determining, based on a spatial-temporal distribution characteristic of historical service data of the current period and a spatial-temporal distribution characteristic of historical service data of a previous period, whether the division of the preset area needs to be updated.

23. The apparatus according to claim 22, wherein the determining whether the division of the preset area needs to be updated comprises:

comparing whether a similarity between the spatial-temporal distribution characteristic of the historical service data of the current period and the spatial-temporal distribution characteristic of the historical service data of the previous period is greater than the preset threshold; and if the similarity between the spatial-temporal distribution characteristic of the historical service data of the current period and the spatial-temporal distribution characteristic of the historical service data of the previous period is greater than the preset threshold, determining that the division of the preset area needs to be updated, or if the similarity between the spatial-temporal distribution characteristic of the historical service data of the current period and the spatial-temporal distribution characteristic of the historical service data of the previous period is not greater than the preset threshold, determining that the division of the preset area does not need to be updated.

24. A cluster system, comprising:

a plurality of compute nodes, and a management node comprising:

a processor, and a memory coupled to the processor to store instructions, which when executed by the processor, cause the management node to perform:

obtaining historical service data, wherein the historical service data is service data in several periods before a current period, wherein a cluster system is responsible for processing service data in a preset area;

determining a spatial-temporal distribution characteristic of the historical service data;

dividing the preset area into M sub-areas based on the spatial-temporal distribution characteristic of the historical service data, wherein a difference value in distribution of the historical service data between the M sub-areas is less than a preset threshold, and M is an integer greater than 1; and determining correspondences between the M sub-areas and N compute nodes, and routing service data of sub-areas in the M sub-areas to corresponding compute nodes for processing.

* * * * *